US007450940B2

(12) United States Patent
Myers et al.

(10) Patent No.: US 7,450,940 B2
(45) Date of Patent: Nov. 11, 2008

(54) WIRELESS NETWORK COMMUNICATION SYSTEM AND METHOD

(75) Inventors: Robert L. Myers, Mississauga (CA); Paulo Neves Francisco, Mississauga (CA); Michael P. Montemurro, Toronto (CA); Ania Halliop, Toronto (CA); Ivan Chvets, Toronto (CA)

(73) Assignee: Chantry Networks, Inc., Mississauga, Ontario (CA)

( * ) Notice: Subject to any disclaimer, the term of this patent is extended or adjusted under 35 U.S.C. 154(b) by 934 days.

(21) Appl. No.: 10/833,093

(22) Filed: Apr. 28, 2004

(65) Prior Publication Data

US 2004/0214576 A1 Oct. 28, 2004

Related U.S. Application Data

(60) Provisional application No. 60/465,798, filed on Apr. 28, 2003.

(51) Int. Cl.
*H04Q 7/20* (2006.01)
*H04L 12/28* (2006.01)
*H04L 12/56* (2006.01)

(52) U.S. Cl. .................................. 455/432.1; 370/397

(58) Field of Classification Search ............... 455/432.1; 370/397
See application file for complete search history.

(56) References Cited

U.S. PATENT DOCUMENTS

| | | | |
|---|---|---|---|
| 5,828,663 A | 10/1998 | Ikegami | |
| 6,002,679 A | 12/1999 | Liu et al. | |
| 6,016,318 A | 1/2000 | Tomoike | |
| 6,272,129 B1 | 8/2001 | Dynarski et al. | |
| 6,400,722 B1 | 6/2002 | Chuah et al. | |
| 7,193,985 B1* | 3/2007 | Lewis et al. | 370/338 |
| 2001/0055283 A1 | 12/2001 | Beach | |
| 2002/0022491 A1 | 2/2002 | McCann et al. | |
| 2002/0059434 A1 | 5/2002 | Karagouz et al. | |
| 2002/0069278 A1 | 6/2002 | Forslow | |
| 2002/0072382 A1 | 6/2002 | Fong et al. | |
| 2002/0085719 A1 | 7/2002 | Crosbie | |

FOREIGN PATENT DOCUMENTS

WO WO 02 09458 A2 1/2002

OTHER PUBLICATIONS

Perkins, C., "Request for Comments: 2002, IP Mobility Support", IETF, XP002222715, Oct. 1996.
Johns, Heath; "Understanding Zeroconf and Multicast DNS"; www.oreillynet.com; Dec. 20, 2002.

* cited by examiner

*Primary Examiner*—Vincent P. Harper
*Assistant Examiner*—Marivelisse Santiago

(57) ABSTRACT

A wireless network and associated method for providing continuous communication service for a mobile unit as it roams within a virtual wireless network. The virtual network includes home and foreign access controllers and a virtual network manager (VN manager). The VN manager is used to maintain a VN configuration record that includes all active access controllers within virtual network and to disseminate said VN configuration record to all active access controllers. A tunneling data communication connection is established between all active access controllers including home and foreign access controllers. When a mobile unit first connects to home access controller and then roams to foreign access controller, communication data is transmitted between the mobile unit and the foreign access controller to provide continuous data communication on the basis of the characteristics defined by the virtual networking services while simultaneously preserving the IP configuration of mobile unit on the network.

18 Claims, 22 Drawing Sheets

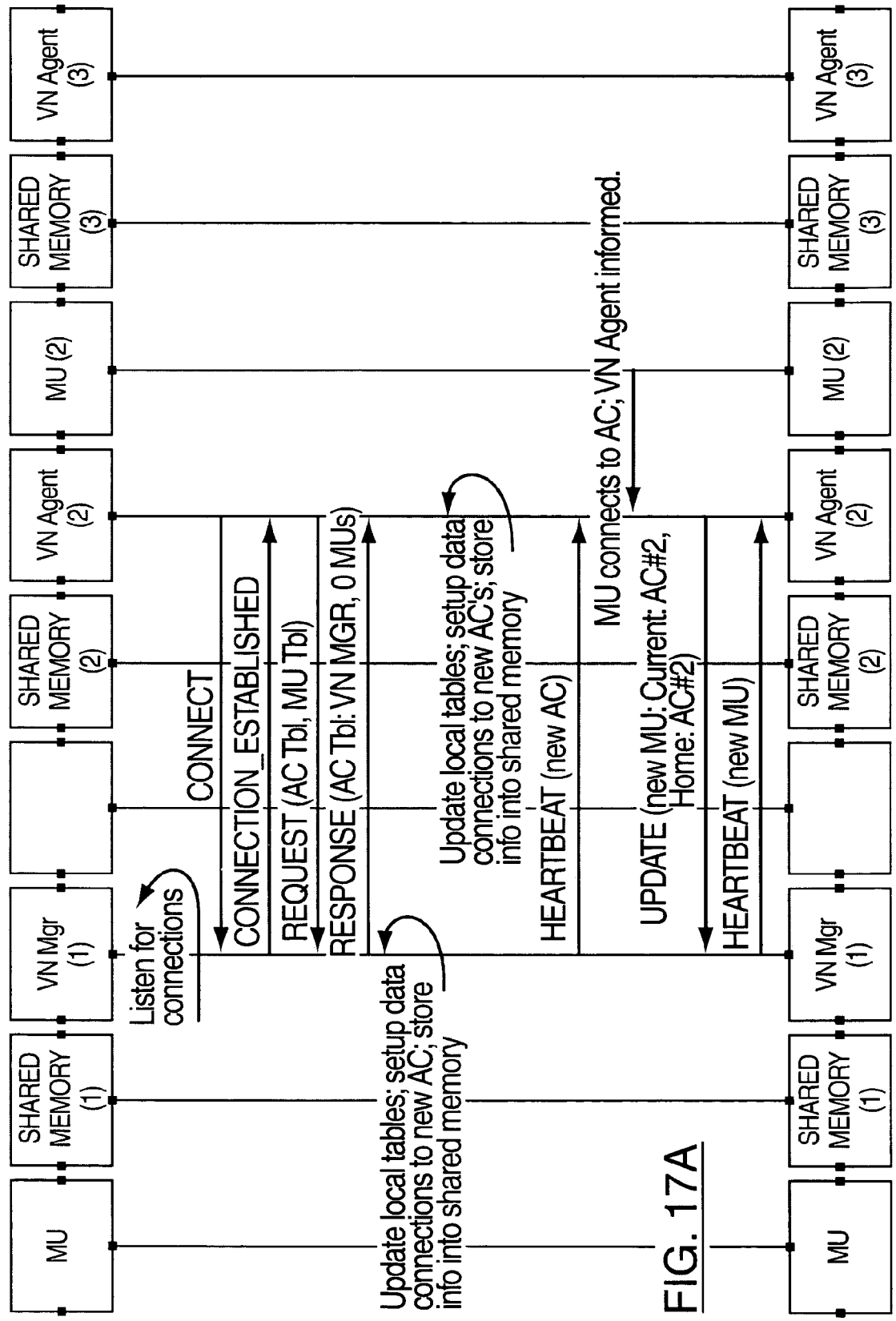

WIRELESS NETWORK COMMUNICATION SYSTEM AND METHOD

This application claims the benefit under 35 U.S.C. 119(e) of U.S. Provisional Application No. 60/465,798, filed Apr. 28, 2003.

FIELD OF THE INVENTION

This invention relates to a wireless communication network and more particularly to a wireless communication system and method for mobile unit session management across a wireless communication network.

BACKGROUND OF THE INVENTION

Virtual networking services (VNS) is a network service provided on a managed IP network that provides for the definition of several virtual wireless LAN networks within a single physical wireless LAN network. By grouping mobile units together using a VNS and controlling their sessions centrally, specific policies can be applied to such groups of users such as which security mechanism is applied, what grade of service is to be provided, or even what network their traffic is associated with (e.g. intranet, Internet etc.) Existing strategies for the deployment of virtual wireless local area networks fail to provide flexible and customizable network connection services to roaming mobile users within a wireless LAN.

A conventional solution is the use of "mobile IP" communication to allow mobile units to connect to different access controllers in a VNS. This approach allows mobile units to preserve their mobile unit's layer 3 (IP) connection to the network. However, this solution requires the use and installation of client software on mobile units. It is desirable to provide mobile unit roaming and access controller availability without the need for the use and installation of client software on mobile units.

SUMMARY OF THE INVENTION

The invention provides in one aspect, a wireless network for providing continuous communication service to a mobile unit within a virtual network without the need to install software on the mobile unit, when the mobile unit initially connects to the virtual network by associating with a home access controller and then subsequently roams to a foreign access controller, said virtual network comprising:
- (a) a virtual network manager (VN manager) adapted to maintain a virtual network configuration record including all active access controllers within the virtual network including home and foreign access controller and to disseminate said virtual network configuration record to all active access controllers;
- (b) said home access controller and foreign access controller being adapted to:
  - (i) establish a tunneling data communication connection between said home access controller and foreign access controller based on the current record maintained by said VN manager; and
  - (ii) utilize the tunneling data communication connection between said foreign access controller and said home access controller and said tunneling data communication connection to provide continuous data communication for the mobile unit In another aspect, the present invention provides a method for providing continuous communication service for a mobile unit as it roams within a virtual network without the need to install software on the mobile unit, said virtual network including home and foreign access controllers and a virtual network manager (VN manager), said method comprising the steps of:
- (a) using the VN manager to maintain a virtual network configuration record including all active access controllers within virtual network including home and foreign access controller and to disseminate said virtual network configuration record to all active access controllers;
- (b) establishing a tunneling data communication connection between all active access controllers including between said foreign access controller and said home access controller;
- (c) connecting the mobile unit to the virtual network by transmitting communication data between the mobile unit and said home access controller;
- (d) determining whether the mobile unit has roamed from the home access controller to the foreign access controller;
- (e) if step (d) is true, then:
  - (i) transmitting communication data between the mobile unit and said foreign access controller;
  - (ii) utilizing the data from step (i) and tunneling data communication connection between said foreign access controller and said home access controller to provide continuous data communication for the mobile unit.

Further aspects and advantages of the invention will appear from the following description taken together with the accompanying drawings.

BRIEF DESCRIPTION OF THE DRAWINGS

In the accompanying drawings:

FIGS. 17A and 17B are communication sequence flow diagrams that illustrate the process flow required for the VN manager and VN agents within an example virtual network (VN).

DETAILED DESCRIPTION OF THE INVENTION

Figure 1:
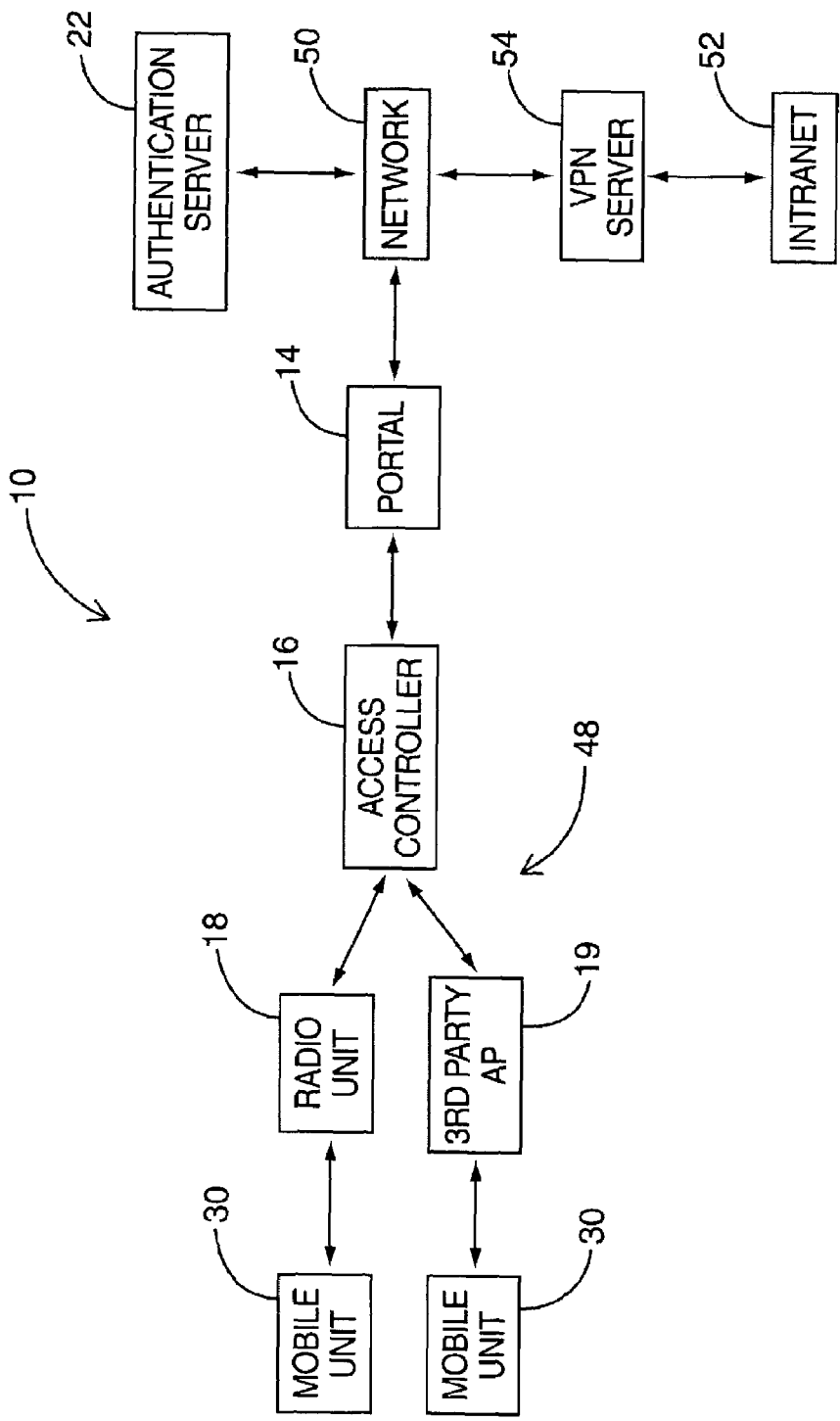
FIG. 1 is a schematic diagram of an example of a high level implementation of the wireless local area network (LAN) of the present invention.

FIG. 1 illustrates the main components of a wireless communication network 10 operating in accordance with a preferred embodiment of the invention. Wireless network 10 includes, a plurality of access controllers 16, a plurality of radio units 18 and third party access points 19, mobile units 30, and a back-end network (e.g. intranet) 50. Using the communication protocol of the present invention, wireless network 10 provides mobile unit traffic segmentation for a plurality of mobile units 30 for the purpose of assigning virtual networking services (VNS).

Mobile unit (MU) 30 is any electronic device that will support wireless communication with the radio unit 18 such as the IEEE 802.11 standard, Bluetooth standard or any other wireless protocol for wireless communication. Mobile unit 30 could be a laptop, personal digital assistant (PDA) or other device capable of wireless communication, including various wireless voice/multimedia communication devices.

Figure 2A:
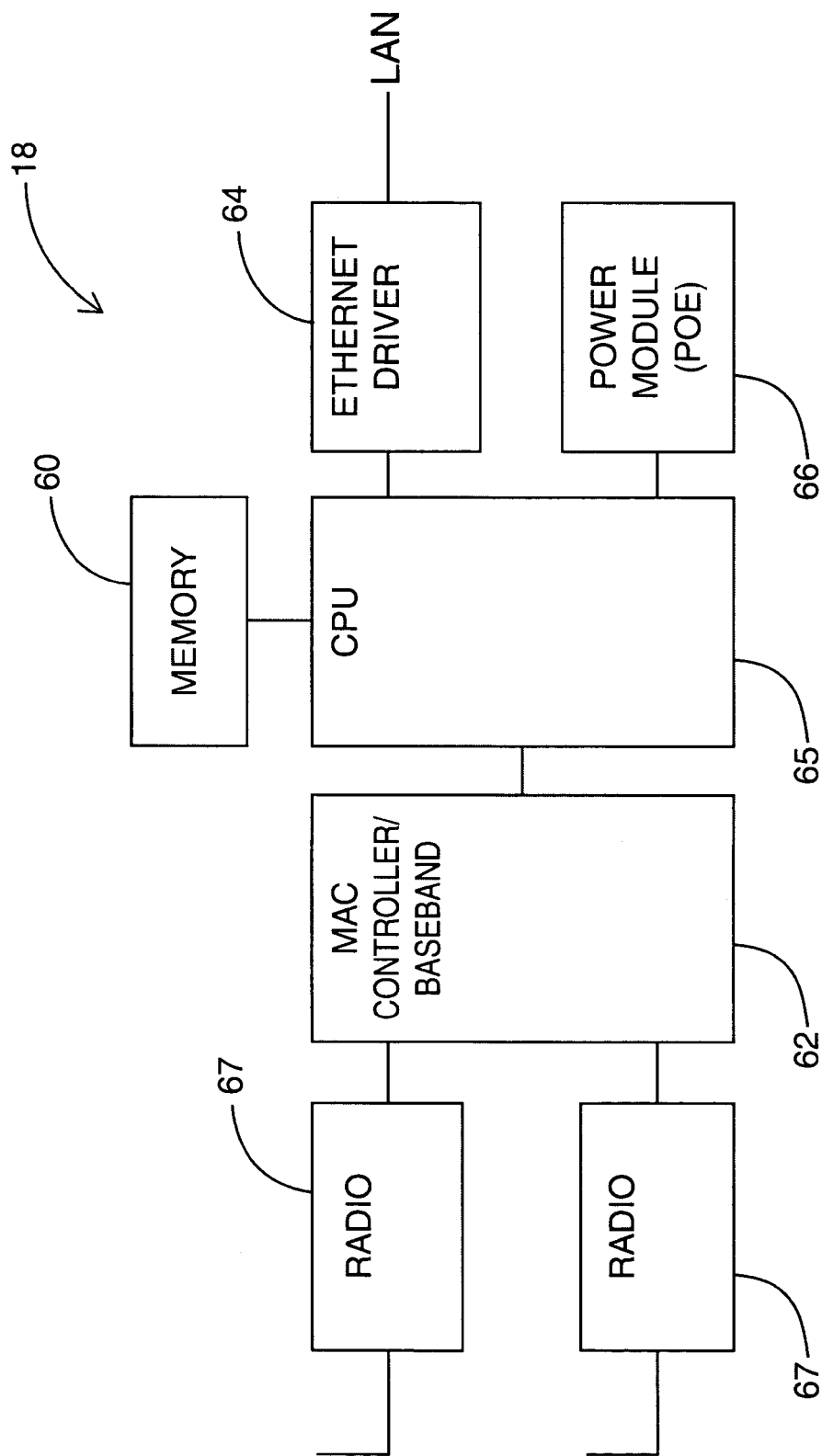
FIG. 2A is a block diagram illustrating the hardware components of the radio unit of FIG. 1.

Radio unit (RU) 18 acts as the connection point for the mobile unit 30 to the wireless network 10. As shown in FIG. 2A, radio unit 18 includes a MAC controller/baseband module 62 and radio front-end electronics 67 which are capable of receiving RF signals from mobile unit 30 in accordance with a wireless standard such as the IEEE 802.11 standard, Bluetooth standard or other wireless communication standard. Radio unit 18 also includes a memory 60, a host processor 65 as well as an Ethernet driver 64. Several radio units 18 can be connected through a backbone, which can be any suitable network technology, such as an Ethernet LAN. It should be understood that wireless network 10 is also able to accommodate third party access points 19 through which to receive mobile unit 30 communication data using other appropriate protocols that are dependant on the specific parameters suited to the particular software and hardware configuration of third party access points 19.

Figure 3A:
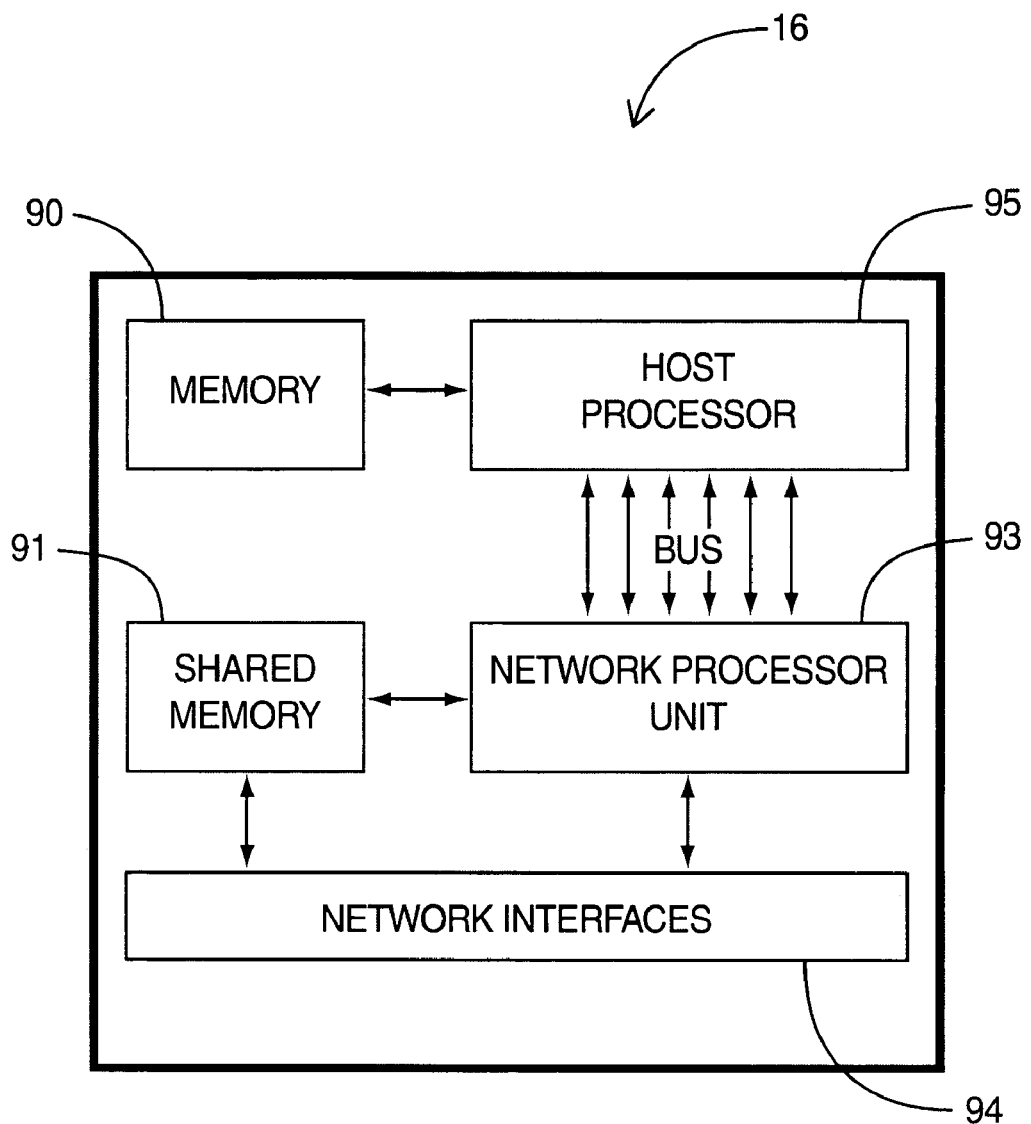
FIG. 3A is a block diagram illustrating the hardware components of the access controller of FIG. 1.

Access controller (AC) 16 is connected within wireless network 10 through a network connection such as Ethernet. Access controller 16 is in communication with the radio unit 18 by way of portal 14. As shown in FIG. 3A, access controller 16 includes a memory 90, host processor 95, shared memory 91, a plurality of network process units 93 and a plurality of network interfaces 94. Shared memory 91 is a memory disk or other data storage device (e.g. RAM) that stores mobile unit session data and radio unit session data as will be described. It should be understood that the hardware configuration described above is just one example implementation of access controller 16 and that many other hardware configurations could be utilized. For example, it is not necessary to utilize separate network process units 93 and host processor 95. Rather, a single processor could be used.

Each radio unit 18 is associated with a radio unit session, and this radio unit session is stored as radio unit session data in shared memory 91. However, it should be understood that for availability purposes, the radio unit session could be stored using a RU_REGISTRY service that keeps session info in OS memory 90 on the Host Processor 95. Also, each mobile unit 30 is associated with a mobile unit session, and this mobile unit session is stored as mobile unit session data in shared memory 91. Host processor 95 is used to provide local processing of mobile unit session data and radio unit session data as will be described. Network interfaces 94 are used to provide communication functionality between access controller 16 and radio unit 18 and access controller 16 and back-end network 50. It should be understood that strong control and data path linkages are provided between access controller 16 and radio unit 18.

Conventional networks can include portals 14 which provide for communication between radio units 18, back-end network 50 and access controller 16. Portal 14 is implemented by a commercially available router such as a Cisco 3725 Multiservice Access Router (manufactured by Cisco Systems of California). It should be understood that while it is not necessary for proper operation of the invention that portal 14 be present within wireless network 10, however, the present invention is adapted to support any existing portals 14 within wireless network 10.

Back-end network 50 can be either a hard-wired network, such as Ethernet or another configuration supported by the IEEE 802 LAN standards or a wireless network. Back-end network 50 connects to authentication server 22 and to access controller 16 either directly or through communication with portal 14. It should be noted that the latter option is utilized if it is desired to authenticate user sessions. Authentication server 22 may be any of a number of standard authentication servers depending on the type of protocol adopted for use between access controller 16 and authentication server 22. For example, if the Remote Authentication Dial In User Service (RADIUS) protocol is adopted for use within wireless network 10, then a Steel Belted RADIUS server (manufactured by Funk Software) would be used. As another example, the LDAP protocol could be used with an associated LDAP compatible server. Authentication server 22 is used as part of the IEEE 802.1x standard to authenticate mobile unit 30 as it attempts to connect to the wireless network 10. Authentication server 22 can also be used to authenticate a mobile unit 30 as part of a Captive Portal feature by capturing the mobile unit 30 information and then sending a message to the authentication server to get confirmation. As is conventionally known, a Captive Portal allows a common browser to be leveraged as a secure authentication device. A Captive Portal also allows for network security via SSL and IPSec and setup per user quality of service (QOS) rules, while still maintaining an open network.

Wireless network 10 can also include a VPN router 54 to provide communication between mobile unit 30 and a customer's Intranet 52 over back-end network 50 as shown. Specifically, VPN router 54 provides a secure connection between access controller 16 and a device on the Intranet 52 by providing a logical connection (i.e. a tunnel over a public network).

Each access controller 16 is adapted to receive communication data from each radio unit 18 during connection of mobile unit 30. The communication protocol of the present invention encapsulates all packets destined or sent from each mobile unit 30, provides control messages to support management of the mobile unit 30 connection, and provides management messages to support the discovery, configuration and management of a radio unit 18. Based on the communication data transmitted to radio unit 18 during connection of the mobile unit 30, access controller 16 is able to discover VNS factors for the mobile unit communication session and to establish a communication session such that the mobile unit is connected to the network on the basis of the characteristics defined by virtual networking services (VNS).

Figure 2B:
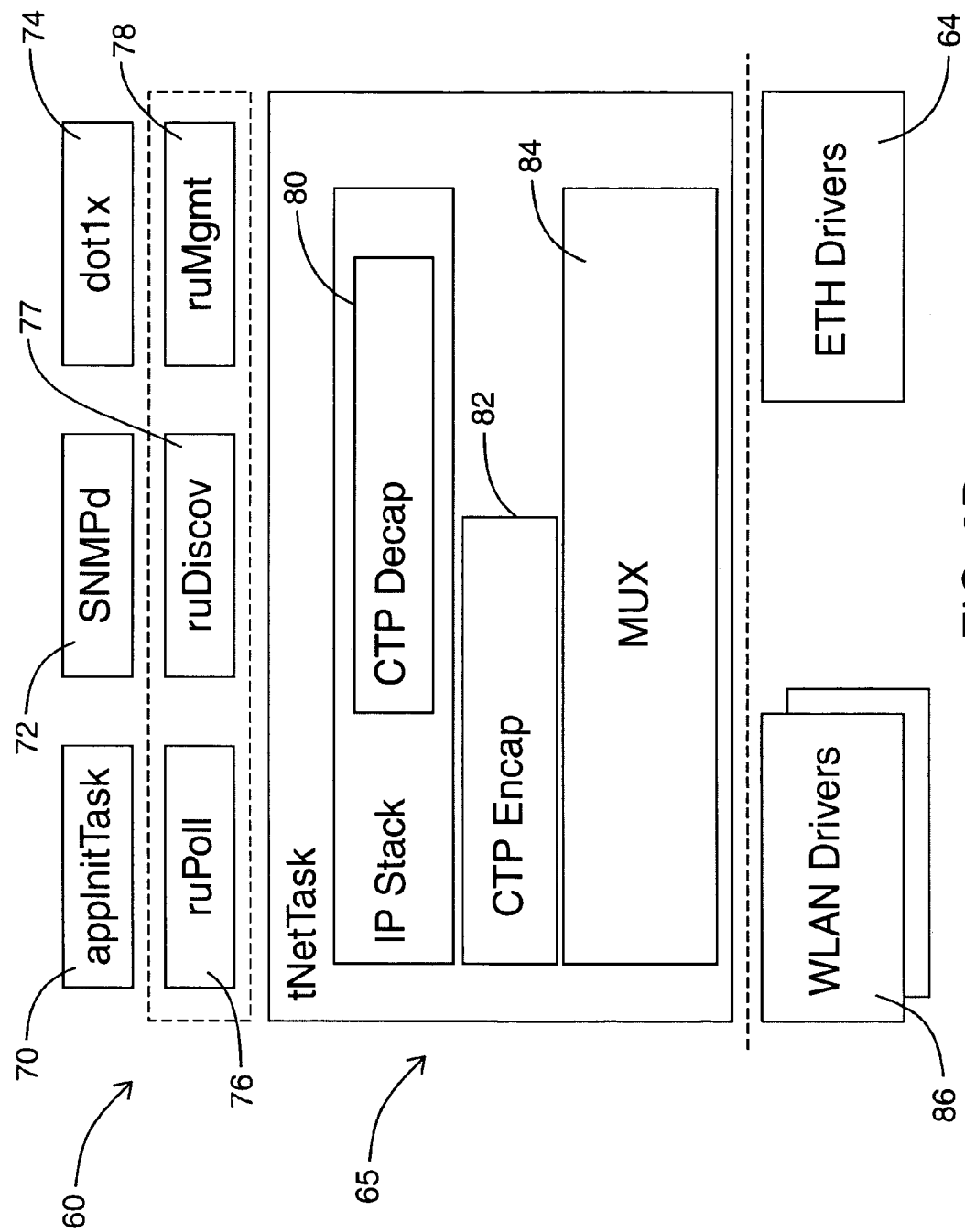
FIG. 2B is a block diagram illustrating the software components of the radio unit of FIG. 1.

FIGS. 2A and 2B illustrate the basic hardware and software components of radio unit 18. Host processor 65 and memory 60 are used to implement the software functionality of radio unit 18 as illustrated in FIG. 2B. Host processor 65 provides the execution space for the configuration and control aspects for the operation of radio unit 18.

As discussed above, radio unit 18 communicates with access controller 16 and passes control information and user data. Radio unit 18 includes a memory 60, a host processor 65, MAC controller/Baseband module 62, radio front-end electronics 67, an Ethernet driver 64, and a power module 66. Radio unit 18 is designed to be a relatively simple and low cost device that provides RF functionality and generally the same functionality as is currently available in commercially available access points. Radio unit 18 also includes various other standard access point power components including a DC-DC converter and isolation components (not shown). It should be understood that the present communication method of the invention could be implemented using any other type of radio unit 18 (i.e. with a particular hardware architecture).

Memory 60 contains apppInitTask module 70, SNMPd module 72, dot1x 74, ruPoll module 76, ruDiscov module 77 and ruMgmt module 78.

Specifically, appInitTask 70 is responsible for the initial configuration of the system upon reboot. SNMPd module 72 represents the interface to the management/configuration aspects of radio unit 18 and can overwrite aspects of the system configuration after reboot. Dot1x module 74 represents the security controller for user authentication using 802.x/EAP authentication mechanisms.

ruPoll module 76, ruDiscov module 77, ruMgmt module 78 are responsible for the control portions of managing the state and configuration of radio unit 18. Specifically, ruDiscov module 77 is responsible for the discovery mechanism for the initial radio unit 18 registration with access controller 16. The ruMgmt module 78 is responsible for the operational state of radio unit 18 once it is registered with an access controller 16. Finally, ruPoll module 76 is responsible for the keepalive mechanism of the communications channel (CBT) between radio unit 18 and access controllers 16. ruMgmt module 78 is the main component for control communications with access controller 16 (e.g. configuration, statistics, state monitoring, etc.).

Specifically, host processor 65 includes a CTP Decap module 80, a CTP Encap module 82, a MUX module 84. CTP Encap 80 and CTP Decap module 82 are responsible for the encapsulation/decapsulation of mobile unit 30 data packets. MUX module 84 is responsible for arbitrating data flows between interface drivers (e.g. "2" for RF, 1 for Ethernet and stack applications). MUX module 84 takes data from the interfaces and passes the data to the stack or the correct interface as required.

Ethernet driver 64 is a conventional Ethernet interface (i.e. 10/100 Ethernet with P.O.E.) and allows radio unit 18 to be connected to existing networks with wired Ethernet. WLAN drivers 86 are conventional WLAN drivers and allow radio unit 18 to be connected to a WLAN.

Following boot initialization by appInitTask module 70, if radio unit 18 is not statically configured with IP address parameters, radio unit 18 negotiates it's network representation address (IP address), supported through its IP stack, with an applicable external network host via standard methods such as DHCP. Upon properly configuring its network access parameters (IP address) radio unit 18 then uses ruDiscov 77 along with Service Discovery Protocol (SLP) to discover an appropriate area service access controller 16. It should be understood that the SLP is not always followed. For example, it is possible to configure radio unit 18 into its "branch office" mode that allows it to connect to a specified access controller 16. Since the controller is pre-configured in this way, SLP discovery is not necessary. Also, it is contemplated that the DNS protocol can be utilized as an alternate discovery mechanism to SLP. Once radio unit 18 is informed of which access controller 16 it is to connect to for service provision, radio unit 18 engages in an active negotiation of authentication parameters with access controller 16 to establish a registered session.

The registration process validates the authentication of radio unit 18 and this process is actively tracked in the active AC Connection Table registry. Once radio unit 18 properly registers with access controller 18, radio unit 18 then engages in the validation and exchange of configuration parameters though ruMgmt 78. These configuration parameters are then interpreted and applied by SNMPd 72 which governs the operation of radio unit 18 and it's network representation assignments (SSID). This negotiation may indicate to radio unit 18 that a software image upgrade may be necessary in order to actively be able to provide network services to mobile units 30 within the definitions of the access controller 16 operations.

The configuration procedure primarily affects the provision of RF services. The configuration procedure is also used to specify operational parameters associated with the wireless protocol driver's and hardware module operations. Once radio unit 18 finishes this configuration process, radio unit 18 then enables MAC controller/Baseband module 62 and radio front-end electronics 67 to operate under the specified configuration, which in turn is able to provide network services to a requesting mobile unit 16. RF front-end electronics 67 support different RF technologies (e.g. 802.11bg (2.4 GHz), 802.11a (5 GHz), etc.) Radio unit 18 also includes internal and optional external antennas (not shown) that are coupled to RF front-end electronics 67 as conventionally known.

The message exchanges that support registration, configuration and data transport is performed using a CTP™ protocol developed by the inventors of the present invention and this protocol will be referred to in the following as the CTP protocol. As mobile units 30 associate with radio unit 18 via the MAC controller/Baseband module 62 and radio front-end electronics 67, radio unit 18 actively communicates with access controller 16 utilizing the CTP protocol to provide the registration of mobile unit sessions and to exchange any data received or to be delivered to the mobile unit 30.

Figure 3B:
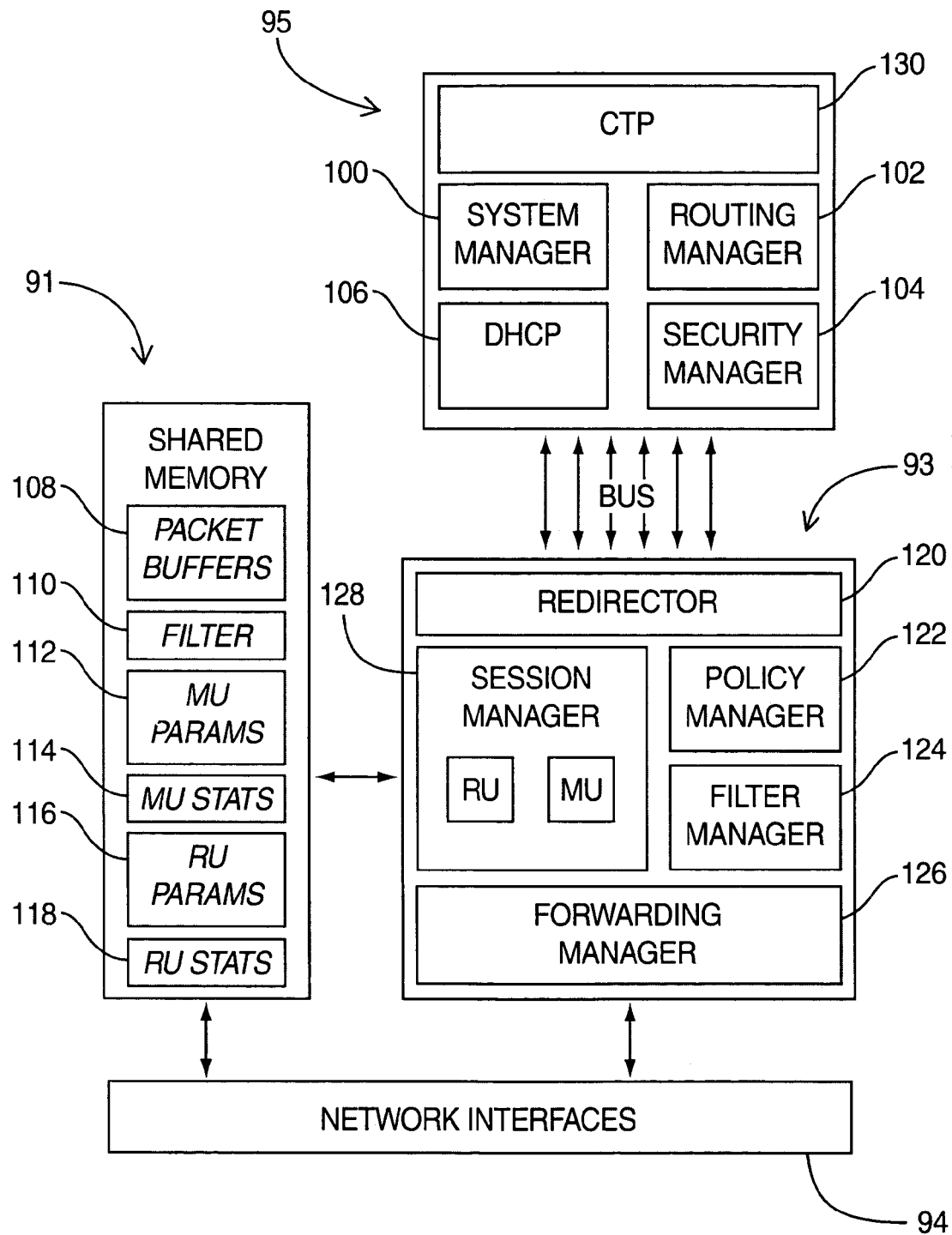
FIG. 3B is a block diagram illustrating the software components of the access controller of FIG. 1.

FIGS. 3A and 3B illustrate the hardware and software components of access controller 16. As discussed above, access controller 16 is where the higher layer packet processing and system management functions reside such as connection management, access security, policy enforcement, management and IP services (filtering, routing QOS, mobility, etc.) The software architecture described in FIG. 3B is implemented through the hardware implementation described in FIG. 3A. Again, it should be understood that the communication method of the present invention could be implemented using any type of commercially available hardware and software including various types of protocol specific drivers.

Access controller 16 includes memory module 90 associated with a host processor 95, a shared memory module 91, a plurality of network process units 93, and a network interface module 94. Host processor 95 and associated memory module 90 can be implemented using any commercially available high performance processing host with sufficient memory and processing speed (e.g. Pentium IV-based host).

FIG. 3B illustrates the specific software modules and their interrelationship within access server 16. The software of access controller 16 is adapted to support the high level features of radio unit management (e.g. auto configuration, software loading, failover, statistics), mobile unit services (e.g. connection management, address assignment) and access security (e.g. RADIUS security, Captive Portal features, 802.11i), policy features (e.g. packet filtering, QOS), mobility (inter and intra access controller), VNS (i.e. traffic steering, VLAN), and system management (i.e. SNMP, bootp, HTML, accounting and statistics) as will be further discussed. It should be understood that the specific software module configuration shown in FIG. 3B is only one example implementation of the software modules of access server 16 and that many other implementations are contemplated;

Host processor 95 includes a CTP service module 130, a system manager 100, a routing manager 102, a security manager 104, and a DHCP module 106 to keep track of IP addresses. Host processor 95 constitutes a management plane that provides high-level management functionality (i.e. management plane) to access controller 16 and is capable of interfacing with a Web server and other back end interfaces.

Shared memory module 91 includes data for routing and filtering data packets as well as for radio unit 18 and mobile unit 30 sessions. Specifically, shared memory module 91 includes packet buffers 108, filter 110, mobile unit parameter table 112, mobile user statistics table 114, radio unit parameter table 116, and a radio unit statistics table 118.

Network processor unit 93 includes redirection module 120, policy manager 122, filter manager 124, forwarding manager 126, session manager 128. Network process unit 93 is functionally divisible into a control plane and a data plane which share access to shared memory module 91. The control plane of network process unit 93 communicates with host processor 95 via a PCI bus or via an Ethernet link.

Data received at network interface module 94 is read into the packet buffer table 108 and is processed according to the rules mandated by the information in the session tables associated with shared memory 91. These session tables provide the definition for registered devices in the mobile and radio unit parameter tables 112 and 116. These definitions dictate the policy to be applied to registered devices, such as the filter definitions stored in filter definition table 110 that apply to such packets. Most of the packets received at the network interface module 94 represent mobile unit 30 packets that can derive enough treatment information from the session tables stored in the stored memory 91 and be processed entirely within the network interface 94 realm. However, packets not directly related to the data flow of a registered mobile unit 30 are delivered for further processing to network processor unit 92.

Specifically, CTP packets relevant to the control and management of registered devices are handled by CTP service module 130, which processes the packets and interacts with the necessary application within session management module 128, which in turn may interact with additional 124 or even with system manager 100 for configuration related activities. Additionally, packets originating from mobile unit 30 or from other network hosts connected to access controller 16 may be delivered to host processor 95 for processing if they pertain to network management and representation services (e.g. address requests handled by DHCP server 106 or routing updates handled by routing manager 102). Mobile unit 30 packets that relate to user authentication may be processed by the redirector module 120 in cooperation with the security manager 104 which is responsible for the propagation of user authentication status change notifications.

Referring now to FIGS. 1, 4A, 4B and 4C, as discussed above, the present invention achieves effective segmentation of mobile units 30 by providing strong control and data path linkages between access controller 16 and radio units 18. This allows various emerging wireless LAN services (e.g. security with 802.11i, QoS with 802.11e, etc.) to be applied to end-to-end mobile device communications.

Specifically, radio unit 18 and access controller 16 are in communication with each other within wireless network 10 at layer 3. This is achieved by encapsulating the necessary data in an IP (Internet protocol) packet with an IP header. This allows access controller 16 to be in a-different physical location from radio unit 18, while still allowing communication between access controller 16 and radio unit 18. Through this encapsulation, data and control information can be exchanged between radio unit 18 and access controller 16. These IP packets with their IP headers are transferred on the network using UDP/IP, although it should be understood that any suitable protocol could be used.

Figure 4A:
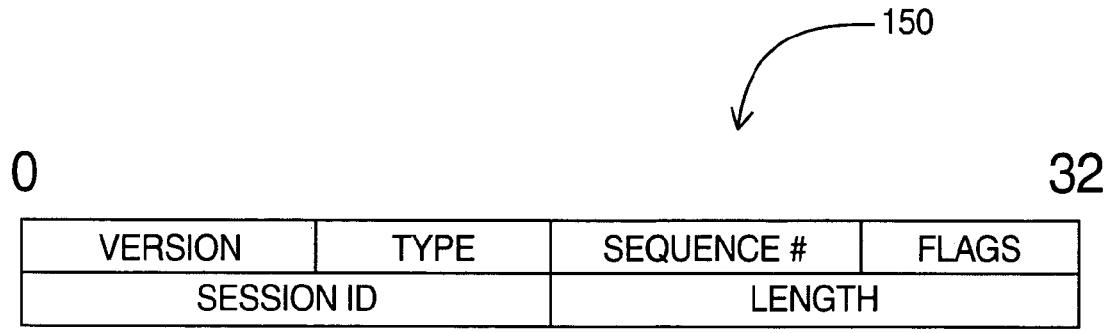
FIG. 4A is a schematic drawing illustrating the radio unit header used for communication between the radio unit and access controller of FIG. 1.
Figure 4B:
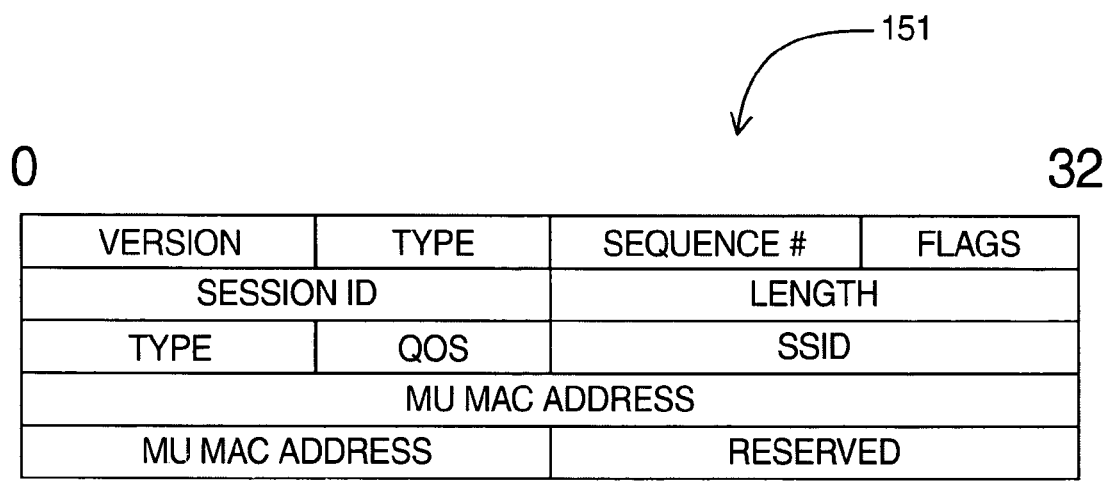
FIG. 4B is a schematic drawing illustrating the mobile unit data header used for encapsulated communication between the radio unit and access controller of FIG. 1.
Figure 4C:
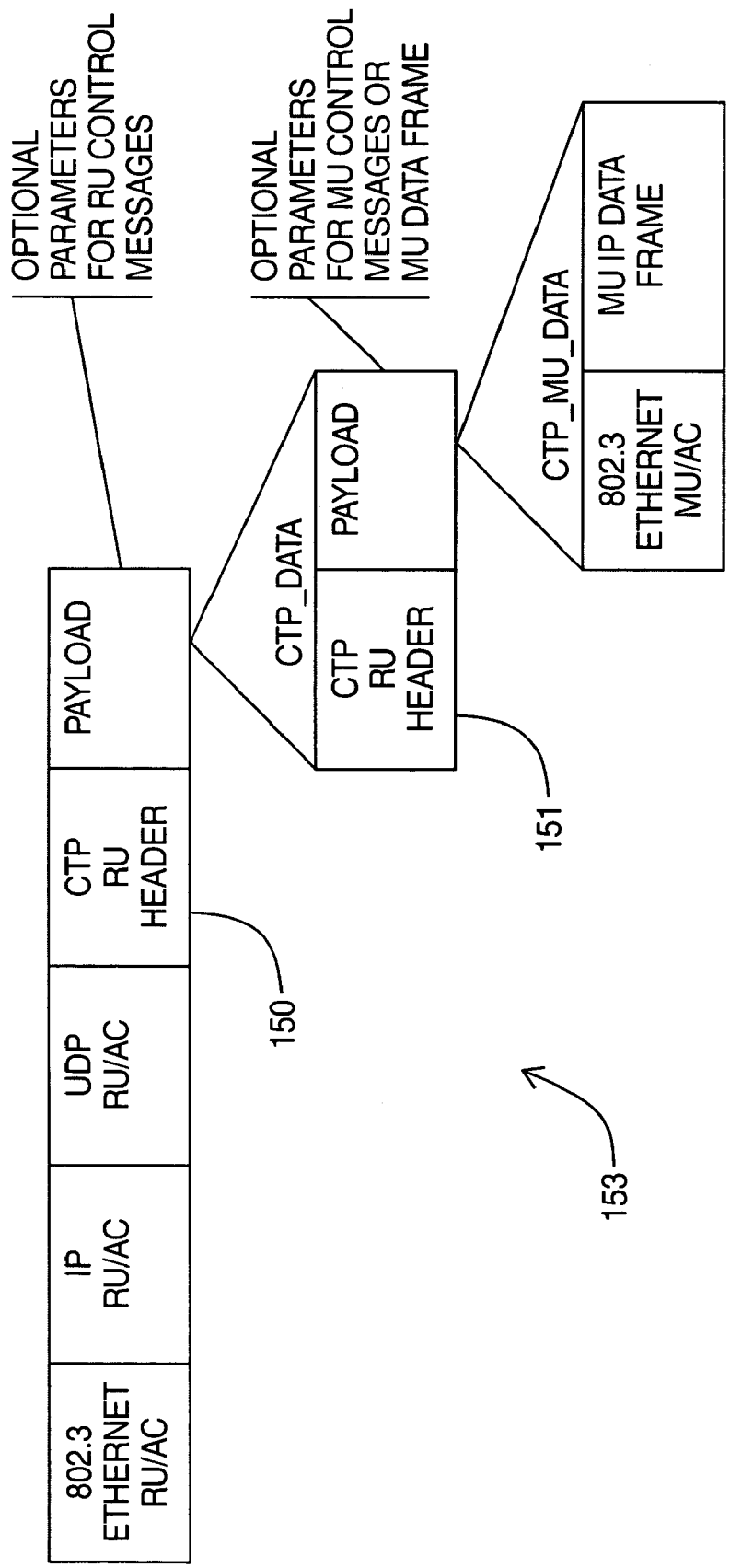
FIG. 4C is a schematic drawing illustrating the complete CTP communication data packet utilized by the wireless LAN of FIG. 1.

FIGS. 4A and 4B illustrate the headers added to the data to form an IP packet used in communicating between radio unit 18 and access controller 16 and FIG. 4C illustrates how these headers are incorporated into the general CTP data packet. The data in the IP packet is treated as two separate layers, namely a radio unit layer having a RADIO UNIT HEADER 150, and mobile unit layer having a MOBILE UNIT HEADER 151. Once the IP packet reaches access controller 16, the headers 150 and 151 are removed and radio unit layer and mobile unit layer messages are interpreted by access controller 16.

FIG. 4A illustrates RADIO UNIT HEADER 150. The radio unit layer is used to establish a communication session between radio unit 30 and access controller 16. Once this session is established, this layer is then utilized as the transport for the mobile unit layer. RADIO UNIT HEADER 150 includes the header fields: Version, TYPE, SEQUENCE#, FLAGS, SESSION ID and LENGTH. The header field Version specifies the protocol version. The radio unit header field TYPE (note there is a mobile unit TYPE field which will be discussed later) identifies the type of radio unit message that is contained in the packet. The header field SEQUENCE# is used to determine the order for multi-packet transmissions that occur when an original packet is fragmented into several packets. The header field FLAGS provides notification of message flow related information (e.g. an indication that a particular message represents the last message in a sequenced set). For example, these fields are used in the situation where a packet is received from mobile unit 30 or from a host that sends a packet that is at the maximum packet size for Ethernet. Since the packet then needs to be encapsulated into the CTP packet and more data needs to be added to it, the maximum packet size supported by Ethernet would be exceeded. Accordingly, it is necessary to split the packet apart into fragments that will fit into the Ethernet packet. The header field SESSION ID identifies the radio unit session to associate the message with. The header field LENGTH specifies the length of the payload.

FIG. 4B illustrates the MOBILE UNIT HEADER 151. It should be noted that the first few fields of MOBILE UNIT HEADER 151 constitute the RADIO UNIT HEADER 150 discussed above. MOBILE UNIT HEADER 151 provides the means for mobile unit 30 to validate with access controller 16 and for the exchange of data between mobile unit 30 and access controller 16. Once this data is encapsulated at radio unit 18, the data is sent to access controller 16. As shown in FIG. 4C, MOBILE UNIT HEADER 151 is carried within the Payload segment associated with RADIO UNIT HEADER 150. The Version, SEQUENCE#, FLAGS, SESSION ID and LENGTH are part of the RADIO UNIT HEADER 150 that encapsulates the MOBILE UNIT HEADER 151.

MOBILE UNIT HEADER 151 also including the following mobile unit related header fields: TYPE, QOS, SSID, MU MAC ADDRESS and RESERVED. The first header field TYPE (mobile unit TYPE field) indicates the subtypes of MOBILE UNIT_DATA that indicates that this message is applicable to a particular mobile unit operation within radio unit 18. Put another way, the TYPE field indicates the purpose of the message as applicable to mobile operation, and may refer to control operations or simply to carry mobile unit 30 data. The QOS field is the QoS identifier.

The header field SSID contains the SSID that mobile unit 30 is using to access radio unit 18. Since mobile units 30 are mapped to a VNS, this field should be understood to represent their current association state to the representing VNS. The header field MU MAC ADDRESS field contains the MAC address of mobile unit 30 accessing wireless network 10 through radio unit 18 or MU MAC ADDRESS. The header field RESERVED is reserved for future use.

As shown in FIGS. 4A and 4B, both RADIO UNIT HEADER 150 and MOBILE UNIT HEADER 151 allow for two types of messages, namely, radio unit layer messages and mobile unit layer messages. The messages used by the radio unit layer are specified in the header field TYPE field of the radio unit header 150 and include an authentication request message, an authentication confirmation message, a session data message, a set state message, a poll message, a halt message and a re-activate message.

When wireless network 10 is configured for dynamic discovery, Service Location Protocol (SLP) is used by radio unit 18 to discover the location of access controller 16. However, if wireless network 10 is configured for static configuration then SLP may be preempted. In the case where wireless network 10 is configured for static configuration, factory defaults will be implemented within radio unit 18 so that radio unit 18 can still rely on SLP discovery for initial connection to access controller 16. However, once connected access controller 16 will configure radio unit 18 with static connection parameters such as IP address specification (whether DHCP is to be used or specific IP address configuration) as well as a list of IP addresses to which radio unit 18 should connect. From then on, when radio unit 18 reboots, radio unit 18 will connect to the specified access controller list, and will forego SLP discovery when attempting to register. That is, radio unit 18 will iterate through the IP addresses in the list until it finds one access controller 16 that it can connect to.

Access controller 16 uses the SLP message to offer its services to radio unit 18. The authentication request message is used by radio unit 18 to request registration of a radio unit session with access controller 16. The authentication confirm message is used by access controller 16 to confirm the registration of the registration of a radio unit session for radio unit 18 in storage module 60 of access controller 16. The session data message is used as the transport of mobile unit layer messages. When session data message is indicated in header field TYPE field of radio unit header 110, the message body is not interpreted by radio unit layer. The set state message allows access controller 16 to alter the operation state of radio unit 18. The poll message, allows access controller 16 to poll access controller 16 to re-activate radio unit 18. The re-activate message is used by access controller 16 to re-activate radio unit 18 when it has been halted. The halt message allows access controller 16 to halt operation of radio unit 18.

The messages used by the mobile unit layer are specified in the header field TYPE field of the mobile unit header 110 and are a subtype of radio units 18 CTP_DATA message TYPE and carried as payload for CTP_DATA as discussed above. In order for these mobile unit messages to be used, the MOBILE UNIT HEADER field TYPE (see FIG. 4B) must indicate a session data message. These messages include an associate request (Associate_Req), an associate response (Associate_Rsp), and a data transport (mu_data) message indicator. It should be understood that within the CTP protocol, re-association operations are treated as normal associate requests (Associate_Req). Host processor 65 then determines if the associate request is a fresh association or a re-association scenario. The mu_data is utilized as the transport for mobile unit 30 related data exchanges. In particular, during the user authentication phase of session establishment, these messages encapsulate the applicable message sets for user authentication that are comprised of an EAP (Extensible Authentication Protocol) request (EAP_Req), an EAP (Extensible Authentication Protocol) response (EAP_Rsp), a user authentication (User_Authentication_Req), a user validation (User_Validation_Rsp). Following authentication, the mu_data encapsulation then carries the user's data frames which provide network representation parameters such as a Dynamic Host Configuration Protocol (DHCP) request (DHCP_Req), and DHCP response (DHCP_Rsp); or general purpose data messages such as HTML requests (HTML_Req).

FIG. 4C is a schematic diagram which shows the complete CTP data packet. It contains an 802.3 Ethernet RU/AC segment, an IP RU/AC segment, an UDP RU/AC segment, RADIO UNIT HEADER 150, and a RU Payload segment. The RU Payload segment contains operational parameters for RU control messages and specifically contains CTP_Data comprising MOBILE UNIT HEADER 151 and a MU Payload segment. The MU Payload segment contains optional parameters for MU control messages or MU Data frame and specifically, CTP_MU_DATA which comprises an 802.3 Ethernet MU/AC segment and a MU IP data frame segment.

Figure 5A:
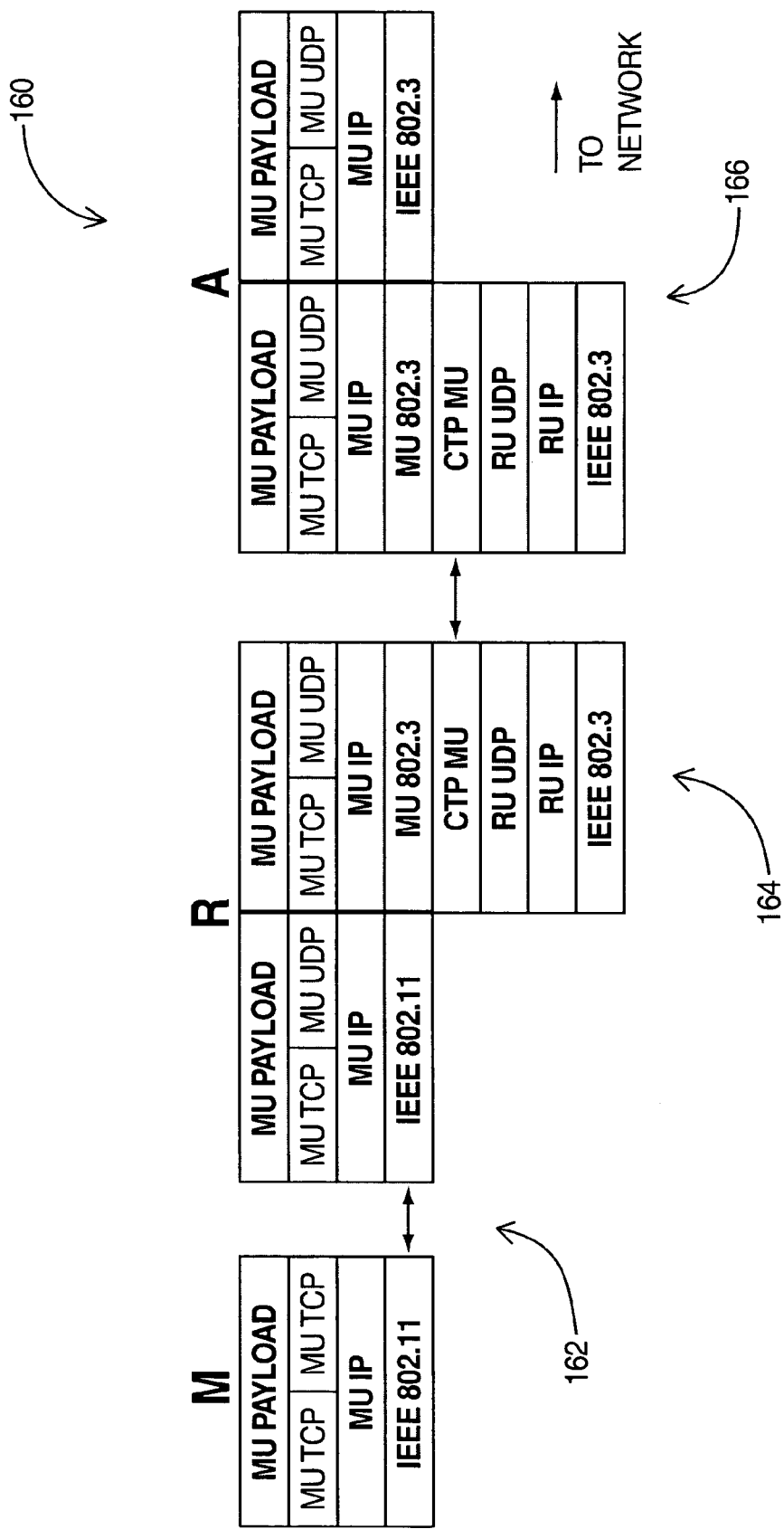
FIG. 5A is a schematic of the mobile unit end-to-end protocol stack associated with the mobile unit, radio unit and access controller of FIG. 1.
Figure 5B:
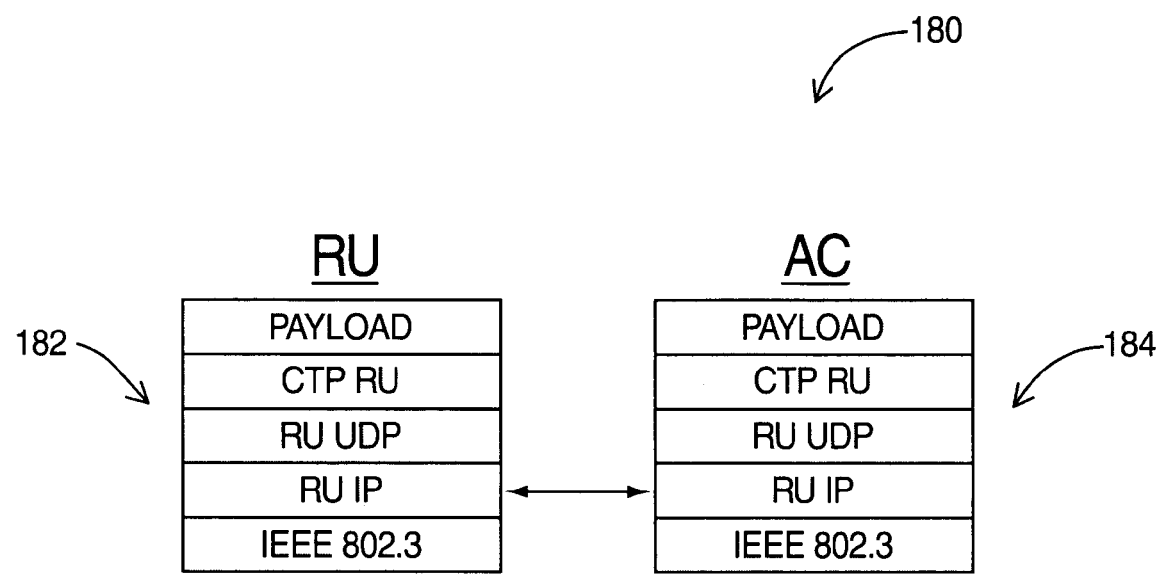
FIG. 5B is a schematic of the protocol stack associated with the radio unit and the access controller of FIG. 1.

FIGS. 5A and 5B illustrate the protocol stacks associated with the mobile unit 30, radio unit 18 and the access controller 16 of wireless network 10. FIG. 5A illustrates the protocol stack that exists between mobile unit 30 and the end host that it wishes to communicate with. FIG. 5B is the protocol stack for communications between radio unit 18 and access controller 16. As is conventionally known, there are three main protocol layers, namely the Medium Access Control layer (MAC), the Network layer and the Transport layer. The MAC layer controls which device is allowed to transmit a message and helps to avoid "collisions" of data packet transmissions. The Network layer handles routing between nodes that are not directly connected. The Transport layer provides end-to-end application layer conversation between network nodes.

Now referring to FIG. 5A, the end-to-end communication protocol stack 160 between mobile unit 30 and an end host through radio unit 18 and access controller 16 is illustrated. The mobile unit protocol stack 162 associated with mobile unit 30 consists of four layers, namely a MU Payload layer, a MU TCP MU layer, a MU IP layer and an IEEE 802.11 layer. The MU TCP MU layer manages the assembling of messages into smaller packets for transmission over the wireless network to radio unit 18. The MU IP layer handles the address part of each data packet. It should be noted that MU Payload, MU TCP MU, and MU IP layers are not affected during the exchange of messages between radio unit 18 and access controller 16. That is, to mobile unit 30 and the end host, radio unit 18 and access controller 16 appear to be transparent at the MU IP MU level and above.

Radio unit protocol stack 164 contains eight protocol layers but only utilizes four protocol layers to communicate with access controller 16. Specifically, radio unit protocol stack 164 includes a MU payload layer, MU TCP MU layer, MU IP layer, MU 802.3 layer, CTP MU layer, RU UDP layer, RU IP layer, and an IEEE 802.3 layer representing the radio unit's wired parameters. MU TCP MU layer receives the packets from mobile device 30 via the MAC controller/Baseband module 62 and radio front-end electronics 67 and reassembles them into the original message. Radio unit 18 provides conversion from IEEE 802.11 to IEEE 802.3 and provides CTP encapsulation of packets being sent to access controller 16 having the MOBILE UNIT HEADER 151. Correspondingly, radio unit 18 provides conversion from IEEE 802.3 to IEEE 802.11 and CTP de-encapsulation of packets being received from access controller 16. It should be understood that radio unit 18 never looks at the MU IP layer or those layers above (i.e. the top four layers are maintained intact through CTP encapsulation).

Access controller protocol stack 166 associated with access controller 16 contains all eight layers of the radio unit protocol stack 164 and provides the MU Payload layer, MU TCP MU layer, MU IP layer, and the IEEE 802.3 layer to back-end network 50. Access controller 16 is responsible for removing the CTP header from MOBILE UNIT HEADER 151 and converting the 802.3 headers from mobile unit 30 into new 802.3 headers. Access controller 16 only uses MOBILE UNIT HEADER 151 to determine which interface to send the packet out on.

FIG. 5B illustrates the protocol stack 180 associated with the communication between radio unit 18 and access controller 16 and the RADIO UNIT HEADER 150. The radio unit protocol stack 182 and the access controller protocol stack 184 both consist of five protocol layers, namely a Payload layer containing information associated with the Radio Unit Header TYPE, a CTP RU layer, a RU UDP layer, a RU IP layer and an IEEE 802.3 layer.

Referring now back to FIG. 1, access controller 16 assigns mobile unit 30 to virtual networking services (VNS) on the basis of data communicated between radio unit 18 and access controller 16, which is in turn based on data received by radio unit 18 from mobile unit 30 as well as information that may be retrieved from authentication server 22. Authentication server 22 during the registration process of mobile unit 30 may instruct access controller 16 to assign mobile unit 30 to a different VNS. When mobile unit 30 begins the connection process to wireless network 10 through radio unit 18, access controller 16 creates a mobile unit session for mobile unit 30 and stores it as mobile unit session data in-mobile unit session table 72 in memory 60. Specifically, during the connection process of mobile unit 30 to radio unit 18, relevant data sent by mobile unit 30 to radio unit 18 is communicated by radio unit 18 to access controller 16.

Access controller 16 then uses this data to discover a number of certain so-called "VNS factors" associated with the mobile unit session. These VNS factors are a set of variables that provide information about what is known about the mobile unit session at a specific point in time. The VNS factors include RADIO UNIT, Service Set Identifier (SSID), Ingress interface (PORT), security mechanism, USER ID, and the MAC address of the mobile unit 30 (MU MAC ADDRESS). The RADIO UNIT factor represents the specific radio unit 18 that mobile unit 30 is accessing. The SSID and Ingress interface (PORT) represents which group of radio units 18 that mobile unit 30 is accessing wireless network 10 through. The security mechanism represents the type of security protocol being utilized (e.g. no authentication, Captive Portal, or 802.1x, etc.).

The USERID factor may be initially provided by mobile unit 30 during a connection attempt. The way that USERID is entered is dependant on the particular security mechanism being utilized. For example, in the case of 802.1x, the USERID is passed from mobile unit 30 to radio unit 18 and then forwarded to the access controller 16 within an encapsulated EAP message. In this case, access controller 16 could have access to the USERID and does not require a response from authentication server 22. However, USERID can also be discovered through a RADIUS response from authentication server 22, which may also include other information which would allow for the assignment of virtual networking services (VNS).

The VNS factors are stored by access controller 16 in shared memory 91 in association with the mobile unit session and are used to determine various associated so-called "VNS parameters" that are to be assigned to mobile unit 30 while it is connected to wireless network 10. These VNS parameters include: an authentication mechanism, an accounting mechanism, IP address pools, an egress interface or virtual router, a quality of service (QoS), packet filters and a walled garden.

The authentication mechanism VNS parameter is the process by which mobile unit 30 will be authenticated on wireless network 10. The accounting mechanism VNS parameter is how the activities of mobile unit 30 are kept track of while mobile unit 30 is accessing wireless network 10. Specifically, the accounting mechanism VNS parameter keeps track of the amount of time spent on the wireless network 10, the services accessed and amount of data transferred.

The Egress interface (or virtual router) VNS parameter is what identifies which specific interface or specific back-end network 50, mobile unit 30 traffic will be forwarded to. Specifically, according to the present invention, it is possible to forward mobile unit 30 traffic out of a specific interface or onto a specific back-end network 50. In the case where access controller 16 has connections to a number of independent (non-communicating) back-end networks 50, it is possible to confine mobile unit 30 traffic to a selected back-end network 50. This mechanism allows for mobile unit traffic to be restricted to an appropriate back-end network on the basis of the USERID of a mobile unit 30.

The quality of service or QoS VNS parameter specifies the minimum level of data throughput that mobile unit 30 will transfer to and from wireless network 10 (i.e. to achieve a certain level of quality of service). The IP address pool VNS parameter is a pool of IP addresses from which an IP address can be assigned to mobile unit 30. The packet filter VNS parameter specifies a desired pattern for the data packets transferred from mobile unit 30 to wireless network 10 or from wireless network 10 to mobile unit 30 that all data packets must match to be passed through the filter. The walled garden VNS parameter controls what information (e.g. Web sites) a mobile unit 30 is able to access on the Internet over wireless network 10. One walled garden VNS parameter setting could be used to screen out unwanted material or to direct mobile unit 30 to sites endorsed by owners of wireless network 10, and another walled garden VNS parameter setting could be used to prevent mobile units 30 with limited capacity to display content (e.g. cell phones or PDAs), to access only those sites that mobile unit 30 is physically able to display. An example of this mechanism would be allowing cell phones to visit only sites encoded in WAP. Another example is in the case of a phone service deployment would be where access to the phone gateway is secured (i.e. locked down).

Each of these VNS parameters are divided into one of three VNS categories or groups, namely a network assignment category, a general policies category and a location and time based category. Accordingly, each of these VNS categories is a group of VNS parameters that are applied to a particular mobile unit session. Within each VNS group category variants are possible based on the influence of the different VNS factors at issue. That is, for a particular VNS parameter associated with a VNS category, the specific representation of the VNS category may be affected by related conditions (e.g. the type of security mechanism may affect the end value of the network assignment).

The network assignment VNS category is a group of VNS parameters that define the network that the mobile unit session will be associated with. The network assignment VNS category includes the IP address pool and Egress Interface/ Virtual Router VNS parameters. Once the network assignment parameters are defined, they remain for the duration of the session and cannot be changed without creating a new mobile unit session unless the authentication method involves EAP/802.1x authentication with the aid of an authentication service. In such a case, authentication server 22 may instruct access controller 16 to assign mobile unit 30 to a different VNS.

As discussed above, in the case of network assignment, the network assignment group may define the IP address pool and the Egress interface based on the type of security mechanism VNS factor. Accordingly, mobile units 30 with 802.1x would have a network assignment that represents the corporate network whereas mobile units 30 without 802.1x would have a network assignment that represents the Internet.

The general policy VNS category is a group of VNS parameters which define the set of policies that will be applied to a mobile unit session. The general policy VNS category includes the accounting mechanism, the quality of service (QOS), packet filters and walled garden (if applicable) VNS parameters. As is the case for network assignment, once these policies are defined they remain for the duration of the session and cannot be changed without creating a new mobile unit session. The general policy parameters are essentially the default parameters that are associated to a VNS upon the connection of mobile unit 30 connecting to wireless network 10.

The location and time-based VNS category is a group of VNS parameters that define a set of policies that will be applied to a session based on the location of its current connection or the current time. The location and time-based VNS category includes the accounting mechanism, the QoS and packet filters VNS parameters. These location and time-based VNS parameters overlap some of the general policy parameters and can either override the general policy parameters where there are conflicts or add to the general policies. The location and time-based parameters are the only category of the three that can be altered after mobile unit 30 has completed the connection process to wireless network 10 (i.e. as mobile unit 30 moves from location to location or based on time of day).

Figure 6A:
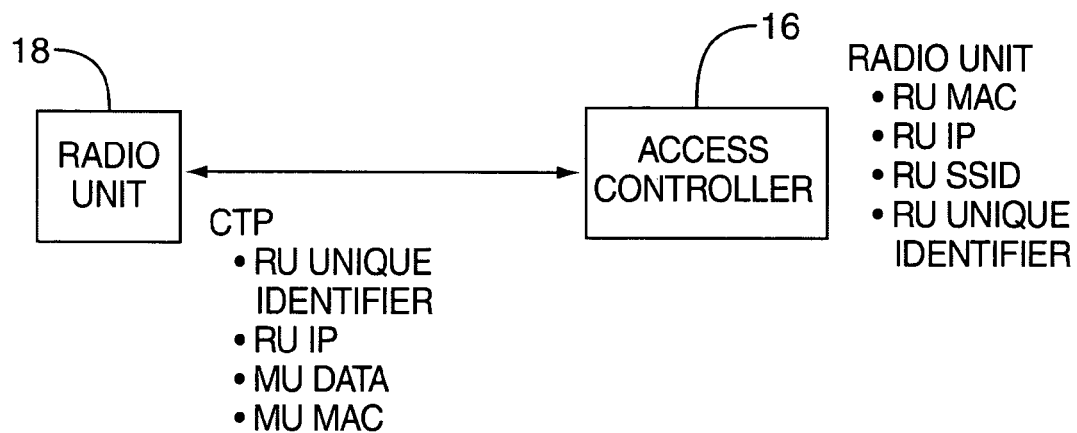
FIG. 6A is a schematic diagram illustrating the VNS factors known by the access controller and the VNS factors discovered by the radio unit and communicated to the access controller during time segment t1.
Figure 6B:
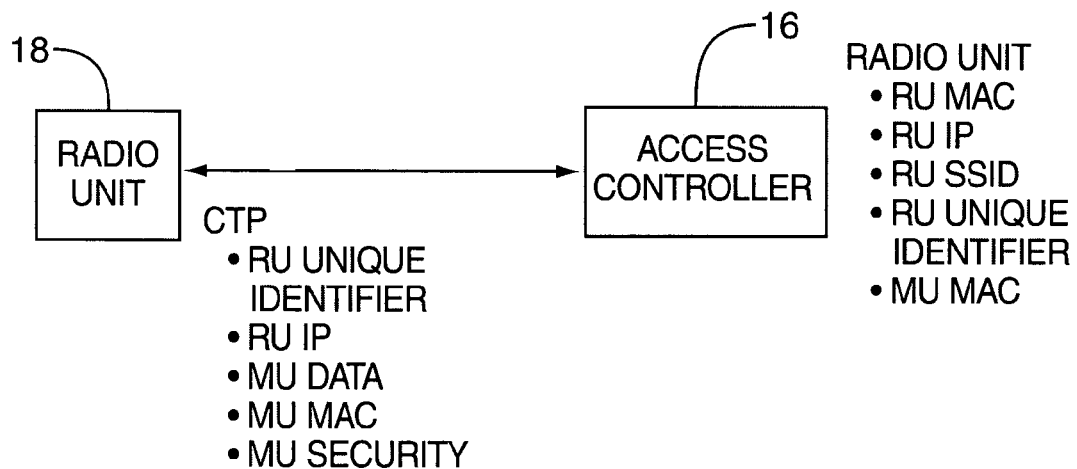
FIG. 6B is a schematic diagram illustrating the VNS factors known by the access controller and the VNS factors discovered by the radio unit and communicated to the access unit during time segment t2.
Figure 6C:
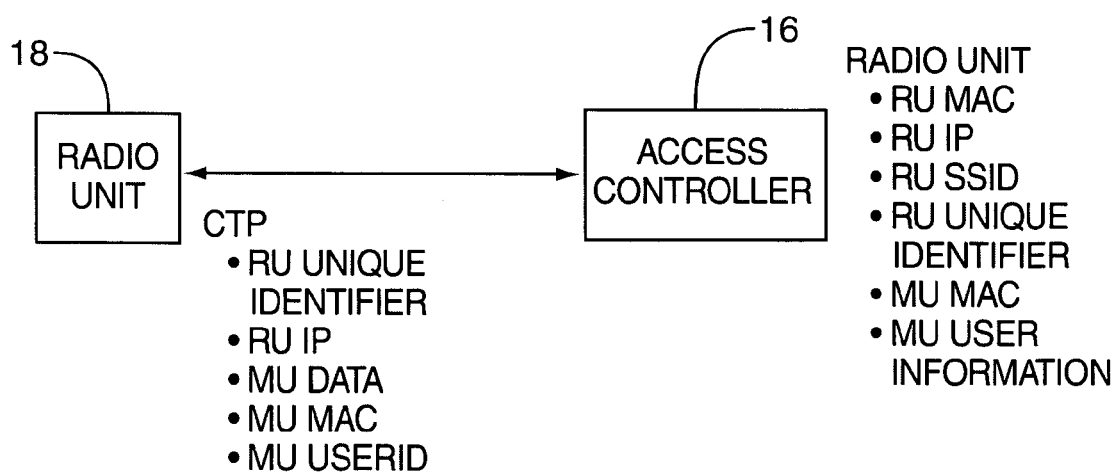
FIG. 6C is a schematic diagram illustrating the VNS factors known by the access controller and the VNS factors discovered by the radio unit and communicated to the access controller during either time segment t3 or t4.

FIGS. 6A, 6B and 6C illustrate communication between radio unit 18 and access controller 16 for the events discussed above.

FIG. 6A shows the VNS factors communicated to access controller 16 from radio unit 18 for event t1. As detailed above, access controller 16 is already aware of several VNS factors relating to radio unit 18 when mobile unit 30 begins connection process. These VNS factors are, RU MAC ADDRESS, RU IP ADRESS, SSID and RADIO UNIT SESSION IDENTIFIER (which provides reference to the RADIO Unit's UNIQUE IDENTIFIER). RU BIND KEY is only used during radio unit 18's registration process as a method to obtain an access controller 16 registered SESSION ID. From then on, the SESSION ID determines the radio unit 18 identification from local memory storage using the RU BIND KEY or any other identifier including IP and Serial number.

For event t1, radio unit 18 communicates to access controller 16, the RADIO UNIT SESSION ID and RU IP ADDRESS VNS factors and mobile unit data from the association request, which includes MU MAC ADDRESS. The SESSION ID and MU IP ADDRESS are used by access controller 16 to determine Which VNS factors to associate with mobile unit session. Specifically, when radio unit 18 goes through the registration process with access controller 18, radio unit 18 uses the BIND KEY to prove authentication after which it is assigned a SESSION ID. The SESSION ID is then used from then on to indicate which radio unit 18 the data packet was received from.

FIG. 6B illustrates the communication between radio unit 18 and access controller 16 for event t2. As shown in FIG. 8B, access controller 16 has already discovered the RU IP ADDRESS, the SSID, RU SESSION ID, RU LOCATION, RU BIND KEY and MU MAC ADDRESS VNS factors for the mobile unit session. Factoring in RU LOCATION into VNS decisions can be beneficial as it can allow for different behaviour or even traffic characteristics and shaping profile depending of where the providing radio unit 18 (i.e. and accordingly the mobile unit 30) actually geographically is located. Radio unit 18 communicates to access controller 16 the RU SESSION ID, RU VNS Assigned ID, RU IP ADDRESS, and mobile unit variables learned from the EAP request (225), including MU MAC ADDRESS and mobile unit security mechanism. It should be noted that the SESSION ID is what is actually exchanged in data messages. From SESSION ID we can determine any other factor and accordingly this VNS factor provides all the indexing and identification needed. The only message that uses the BIND KEY is the RU_REGISTER_REQUEST that uses it to establish the validation means for the creation of a RU session (identified by RU SESSION ID). RU SESSION ID, RU IP ADDRESS and MU MAC ADDRESS, which are shown being communicated between radio unit 18 and access controller 16 in FIG. 8B, are used to determine which mobile unit session the new VNS factors belong to.

FIG. 6C illustrates the communication between radio unit 18 and access controller 16 for event t3 or event t4. As shown in FIG. 8C, access controller 16 has already a discovered a number of VNS factors and associated them with mobile unit session data. These VNS factors include: RU MAC ADDRESS, RU IP ADDRESS, the SSID, RU SESSION ID, RU LOCATION, RU BIND KEY, MU MAC ADDRESS and USER ID. The information communicated to access controller 16 from radio unit 18 is RU SESSION ID, RU IP ADDRESS and mobile unit 30 data. The mobile unit 30 data includes the MU MAC ADDRESS and mobile unit 30 USER ID.

Figure 7:
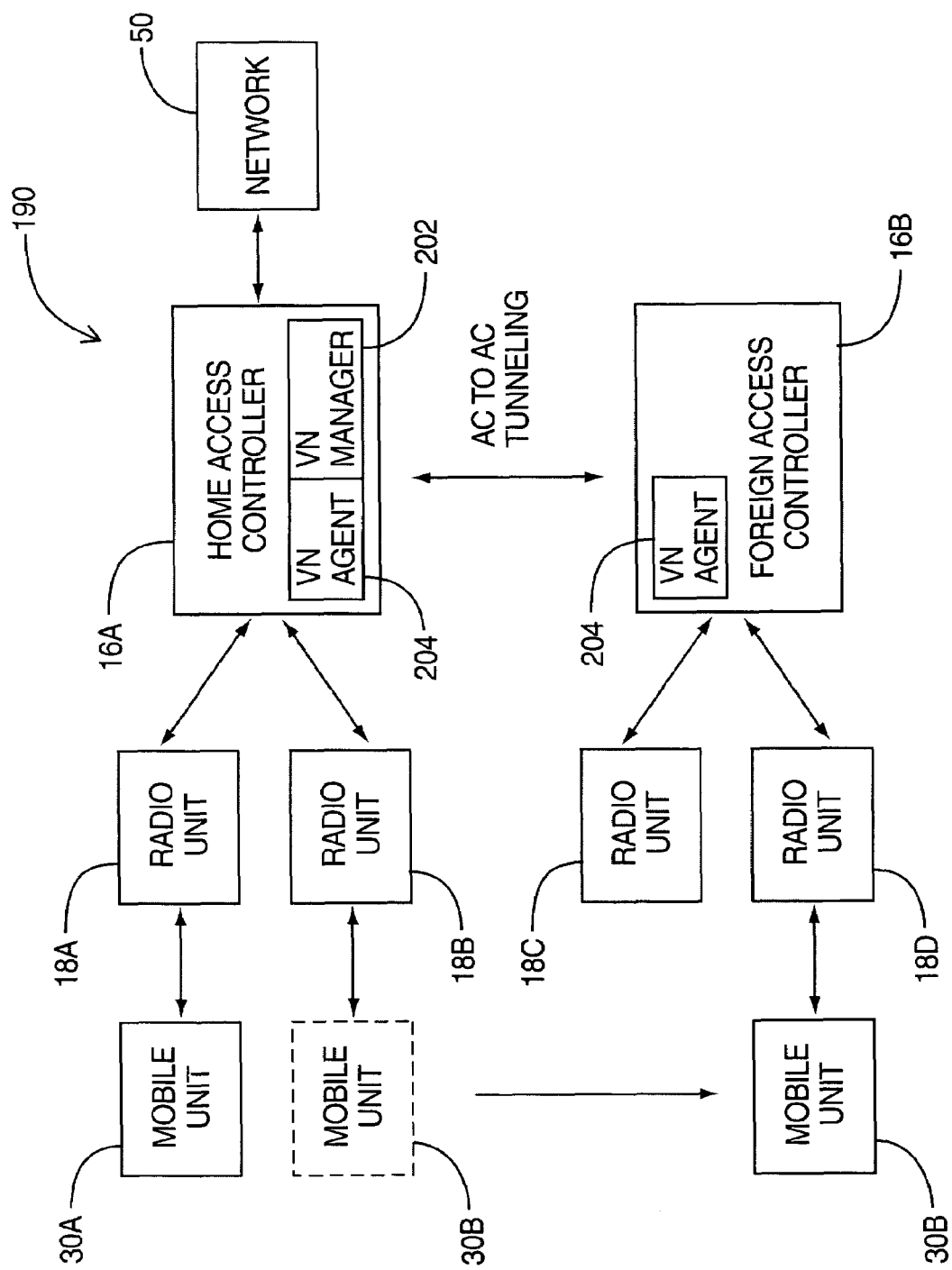
FIG. 7 is a block diagram that illustrates a two-tier multiple access controllers network topology for the wireless LAN of FIG. 1.

FIG. 7 illustrates an example wireless LAN 190 having a two-tier multiple access controllers network topology. Specifically, mobile units 30A and 30B connect to network 50 to establish a wireless connection through radio units 18A, 18B, 18C or 18D. Access controllers 16A and 16B communicate with radio units 18A, 18B, 18C or 18D and control operation of radio units 18A, 18B, 18C or 18D. Access controllers 16A and 16B provide mobile unit session management including the termination of wireless sessions and mobility. Access controllers 16A and 16B also provide network access, network services (e.g. IP filtering, Network Address Translating (NAT), Quality of Service (QoS), and routing), security and controls data transmission to the wired network as well as providing a management interface to the entire system (i.e. radio units 18A, 18B, 18C or 18D and access controllers 16A and 16B. As detailed above, the CTP protocol is used to exchange control messages and mobile unit 30A and 30B data between a radio unit 18A, 18B, 18C or 18D and an access controller 16A or 16B.

Wireless LAN 10 provides CTP data tunneling between access controllers 16A and 16B to provide roaming and availability services to mobile units 30A and 30B. This is accomplished by establishing and maintaining CTP tunnels within wireless LAN 10 using the concept of a virtual network (VN) based on a virtual network manager (VN manager) 202 and virtual network agents (VN agents) 204. CTP data tunnels are established in a mesh-pattern between all entities of the virtual network. VN managers 202 and VN agents 204 allow access controllers 16A and 16B to exchange session information to allow mobile units 30A and 30B to roam between radio units 18A, 18B, 18C and 18D connected to different access controllers 16A and 16B. VN manager 202 and VN agents 204 are implemented as software modules within access controllers 16 and allow multiple access controllers 16 to exchange session information. VN manager 202 also oversees the state of VN level CTP data tunnels.

A VN agent 204 exists on every access controller 16 and updates the VN manager with session updates, as will be described. A VN manager 202 is associated with one of the access controllers 16 in the virtual network group (VN group). Accordingly, if mobile unit 30B roams from access controller 16A to access controller 16B, the data traffic associated with mobile unit 30B will be tunneled through access controller 16A, as the access controller that mobile unit 30B originally connected to. The "first connected-to" access controller 16A is called the HOME access controller.

Each access controller 16A and 16B is managed as an independent node and configured separately. The VN manager 202 and VN agent 204 together allow access controllers 16A and 16B to exchange access controller information and mobile unit session information to facilitate mobile unit roaming. All VN agents 204 maintain a TCP/IP connection to the VN manager. The VN manager 202 distributes access controller and mobile unit session updates to the VN agents 204 on an administrator configurable heartbeat interval. When the VN agents 204 receive a heartbeat they will then respond with updates to the VN manager. The protocol that facilitates these exchanges is called the VN control protocol.

Each access controller 16 maintains a CTP Data Tunnel connection to every other access controller 16 in the VN. Which means, if there are n access controllers 16 in the VN, there will be $n(n-1)/2$ connections between access controllers 16. The CTP data tunnel connection extends the radio unit 18 to access controller protocol to support the tunneling of mobile unit data between access controllers 16. When a mobile unit 30 first connects to a VN (i.e. group of access controllers 16 associated with a particular VN), it is given an IP address on the access controller 16 it connects to (i.e. its HOME access controller (i.e. access controller 16A of FIG. 7)). As the mobile unit 30B roams from access controller 16A to access controller 16B, the network traffic associated with mobile unit 30B continues to be transmitted through its HOME access controller (i.e. access controller 16A of FIG. 7).

Figure 8:
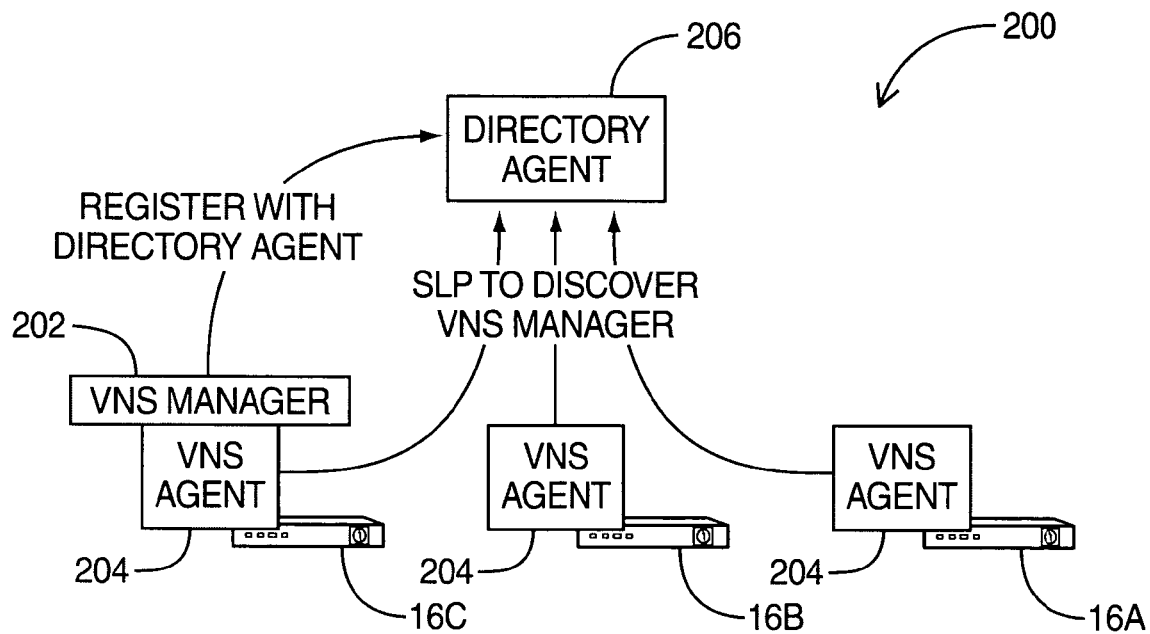
FIG. 8 is a block diagram that illustrates the VN manager and VN agents associated with multiple access controllers associated with a VNS.

FIG. 8 illustrates an example Virtual Network (VN) 200 where an established VN manager 202 is responsible for the collection and propagation of state information to all members of VN 200. VN manager 202 operates by providing periodic notifications of state changes to the members of VN 200. Specifically, VN manager 202 synchronizes all session management across multiple access controllers 16A, 16B and 16C. VN manager 202 is configured to reside on one access controller (i.e. 16C) in the network. VN manager 202 propagates the list of access controllers 16A, 16B and 16C registered to the VN 200 as well as the list of all mobile units 30 registered within these access controllers 16A, 16B, and 16C. Each access controller 16 associated with the VN caches the information locally. Upon initialization, the VN agent 204 in each access controller 16 in VN 200 will attempt to establish a connection with the active VN manager 202. Once registered, the VN manager 202 will obtain a registration ID (i.e. AC_ID) and realize that a new member has joined the VN 200. This access controller information will be propagated by the VN manager 202 on the next heart-beat notification to all VN agents 204.

Correspondingly, as access controllers 16A, 16B and 16C start accepting the registration of mobile unit 30 devices, VN agents 204 within these access controllers 16A, 16B, 16C provide a consolidated report to the VN manager 202 of the modifications mobile unit state changes, which the VN manager 202 then uses to provide a consolidated view of all mobile unit states to every VN agent 204. These reports provide primarily the registration information for established mobile unit 30 sessions, such as HOME access controller, IP Address and other session specific information (e.g. security keys). This information is then utilized by members of VN 200 to be able to properly and expediently establish local copies of a mobile unit's 30 session, and to properly forward related data to the mobile unit's point-of-presence in the network (i.e. HOME access controller). Also, the VN membership list is utilized to establish new CTP data tunnels to new VN mobile units 30. CTP data tunnels are adapted to emulate a regular radio unit 18. Accordingly, each of the access controllers 16A, 16B and 16C, see the CTP data tunnel as another (although special) radio unit 18.

VN agents 204 are configured to reside on each access controller 16A, 16B, and 16C in VN 200. VN manager 202 distributes access controller configuration information to VN agents 204 on a VN agent connection. VN agent 204 uses the access controller configuration information to establish CTP Data Tunnels between the access controller it resides on and other access controllers in VN 200. The Service Location Protocol (SLP) is used to allow VN agents 204 to discover the VN manager 202. VN manager 202 and VN agents 204 use DHCP option 78 and 79 to connect to an SLP directory agent. VN manager 202 registers itself as a service to a directory agent 406. In the event that DHCP option 78 returns multiple directory agents 406 to support availability, VN manager 202 will register with each in succession. VN agents 204 perform a query on directory agent 206 to find the IP address of the VN manager 202.

VN agent 204 and VN manager 202 use a TCP/IP connection to exchange access controller configuration information and mobile unit session information. VN manager 202 distributes updates to the VN agents 204 on a heartbeat. After each heartbeat, the VN agent 204 sends updates to the VN manager 202 in response. It should be understood that preferably VN agent 204 and VN manager 202 are a single application that can operate in either one of two modes. While there will only be a single, statically configured, VN manager 202 in the initial implementation of multiple access controller functionality. It is contemplated that a VN manager 202 could be dynamically assigned using an electoral process to provide redundancy.

Figure 9A:
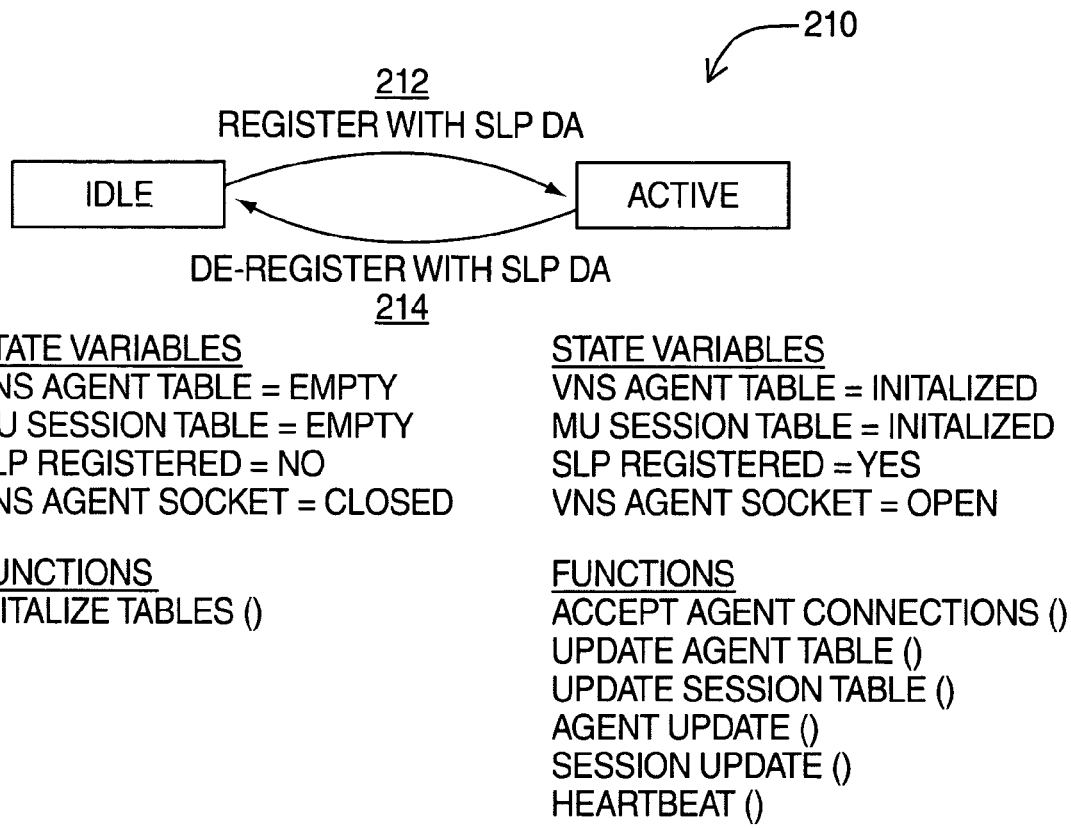
FIG. 9A is a finite state machine representation that illustrates the operation of the VN manager of FIG. 8.

FIG. 9A illustrates a finite state machine representation 210 of VN manager 202. The purpose of the VN manager 202 is to distribute mobile unit session information and access controller information amongst the access controllers 16 in the VN. VN manager 202 uses Service Location Protocol (SLP) to advertise its services to the VN. As shown in FIG. 9A, VN manager 202 service starts in the "IDLE" state when access controller 16 starts-up. As indicated, the VN Agent Table is first initialized and then a VN MU Session Table is initialized. At state transition 212, VN manager 202 registers with the SLP directory agent 206. Once VN manager 202 has registered with directory agent 206, the VN manager 202 begins to listen on a TCP/IP socket for VN agent connections and enters the "ACTIVE" state as shown.

When VN agent 204 first establishes a connection with the VN manager 202, it will query the VN manager 202 to retrieve the entire contents of the VN Agent Table and the VN MU Session Table. When VN agent 204 either closes its connection to the VN manager 202 or VN manager 202 does not receive an update or keep alive message from the VN agent 204, VN manager 202 will update the VN Agent Table by changing the status for the VN agent 204. During normal operation, to support the distribution of MU session information, VN manager 202 distributes only changes (i.e. deltas) to the VN Agent Table and the VN MU Session Table to every VN agent 204 on a heartbeat. The interval of the heartbeat is configurable in seconds (typically 3 to 5 seconds). As a response to this heartbeat each VN agent 204 distributes changes to its VN MU Session Table since the last update to the VN manager 202.

At set-up, the wireless LAN 10 network administrator must select which access controller 16 will be enabled as the VN manager 202 and will have the ability to configure two separate interface parameters. One parameter represents at which port to allow VN manager 202 and VN agent 204 communications (i.e. using the VN control protocol discussed above), and another parameter represents at which port to allow CTP Data Tunneling. However, it should be understood that the data and control connections may also be established over the same interface. In order to prevent a VN agent 204 from communicating with VN manager 202, VN agent 204 needs to be disabled (i.e. set to NONE mode) on the associated VN agent access controller management page. In addition, to disable the VN manager 202, VN manager 202 also needs to be set to NONE mode.

Figure 9B:
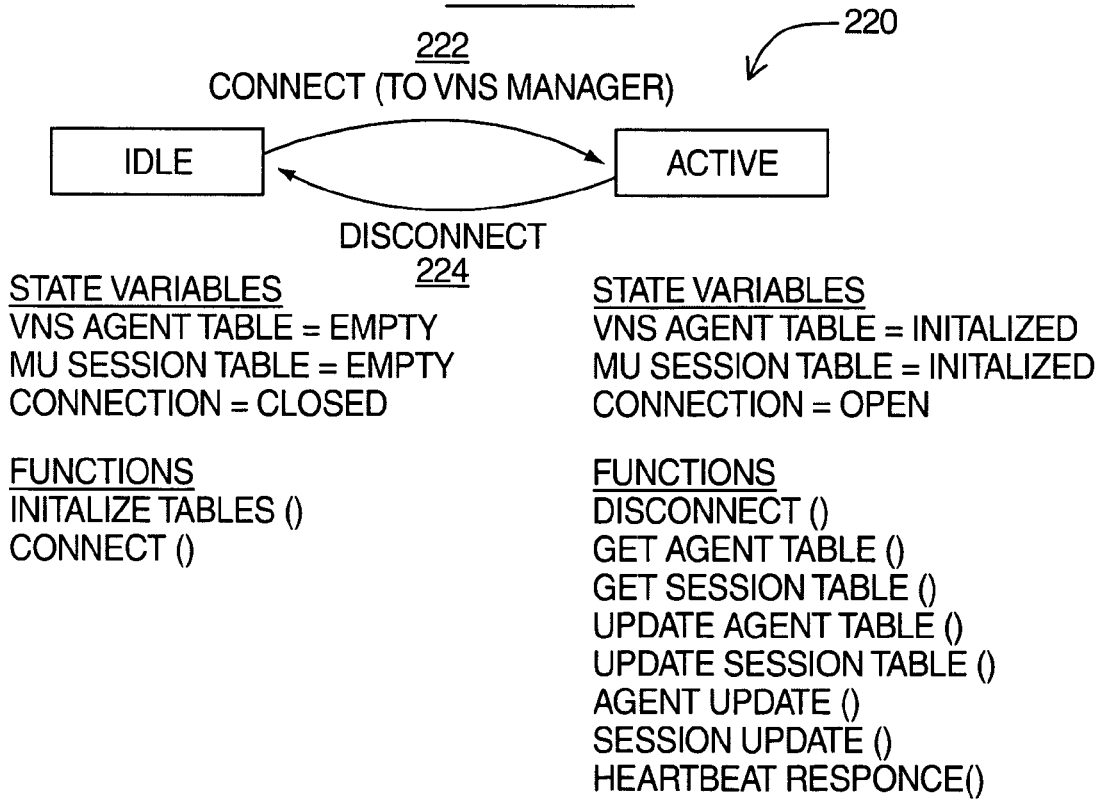
FIG. 9B is a finite state machine representation that illustrates the operation of the VN agent of FIG. 8.

FIG. 9B illustrates a finite state machine representation 220 of VN agent 204. The purpose of the VN agent 204 is to communicate with the VN manager 202 to obtain the list of active access controllers 16 in the VN and to maintain the list of mobile unit sessions in the VN. For each access controller 16, the local VN agent 204 operates as an MU registry that can be queried by the system to determine whether a registering device is already known to the VN. The VN agent 204 starts in the "IDLE" state when access controller 16 starts-up. The VN and the MU Tables are initialized, and the SLP directory agent 206 is queried for the location of the VN manager 202. VN agent 204 then at state transition 222, connects to VN Manager, enters "ACTIVE" state and listens for status changes to other access controllers in the network as well as session updates from the VN manager 202.

When VN agent 204 first connects to the VN manager 202, it queries the VN manager 202 for a list of other access controllers 16 in the VN. VN agent 204 and VN manager 202 maintains a list of active access controllers 16 in the VN so that it can manage CTP Data Tunnels between itself and all the other access controllers 16. When a new access controller 16 joins the VN, VN agent 204 retrieves the contents of the VN Agent Table from the VN manager 202 and establishes CTP Data Tunnel connections to all the access controllers 16 in the VN. When VN agent 204 receives an agent table update from VN manager 202, VN agent 204 updates its VN Agent Table and updates the CTP Data Tunnel state information appropriately.

VN agent 204 sends MU session updates to the VN manager 202 when connected mobile units roam from access controller to access controller (or possibly from radio unit to radio unit). The session updates are stored in the MU Session Table. The VN agent 204 then listens for an update from the VN manager 202 on a heartbeat and updates its Table with any MU Session Table changes. If the VN agent 204 does not receive a heartbeat from its VN manager 202 after a configurable amount of time, VN agent 204 will immediately attempt to re-connect to the VN manager 202 by querying the SLP Directory Agent. If the VN manager 202 is unavailable, the VN agent 204 will continue to repeat this process.

VN agent 204 uses Service Location Protocol (SLP) to find the location of VN manager 202. VN agent 204 enters an "ACTIVE" state and connects to the VN manager 202 using a VN control protocol (a TCP/IP connection protocol). The network administrator configures the associated access controller 16 to be a VN agent 204 (i.e. to indicate that access controller 16 is part of a VN that supports roaming) and can configure two separate interface parameters. One parameter represents which port to support the VN Control protocol, and the other parameter represents which port to support CTP Data Tunneling.

An access controller 16 can be configured to be a VN agent 204 while operational, without requiring access controller 16 to be shutdown or restarted. The network administrator has the ability to disable the VN agent 204 by de-selecting the host access controller as a VN agent 204. The network administrator can deduce the entries in the VN Agent Table by viewing the tunnel status tables or MU session tables.

Each VN message will have a header and a data field. An example VN message header is:

Example VN Header

| Element | # of bytes | Description |
|---|---|---|
| Version | 1 | Protocol version |
| Type | 1 | Identifies the message type: CONNECT 1 CONN_ESTABLISHED 2 REQUEST 3 RESPONSE 4 UPDATE 5 HEARTBEAT 6 DISCONNECT 7 |
| Sequence Number | 1 | Sequence number for multi-message transmissions |
| Flags/Reserved | 1 | This bitmask represents operational constraints on the packet flow: TBD |
| Payload Length | 2 | Length of Payload (header not included) |
| Error Code | 1 | Describing error type |
| Seq Num | 1 | Sequence number |
| Flag | 1 | Flag |
| HB Interval | 1 | Interval for HB |
| Desc IP | 1 | Desc IP |
| Src IP | 1 | Src IP |

Referring back to FIG. 7, there are two tables that support mobile unit 30 roaming between access controllers 16. The VN Agent Table maintains a list of access controllers 16 connected to the VN manager 202 and their operational state. The VN MU Session Table provides information on mobile unit 30 sessions throughout the VN.

The VN Agent Table maintains a list of access controllers 16 connected in the VN. The Table is updated as VN agents 204 connect, disconnect, and reply to heartbeats, from the VN manager 202. The Table includes the following elements: VN IP Address, CTP IP Address, and Descriptor. State (ACTIVE, UNKNOWN, CLOSED) and Tunnel State (connected, disconnected) information are kept in separate internal tables on the VN manager 202. The VN IP address is the port that the. VN control protocol communicates on. The CTP IP Address is the port that the CTP Data Tunnel is set to. It should again be understood that the same port can be used for both control and data functions.

The Descriptor could be a fully-qualified domain name or a descriptor for the access controller 16. The state is the state of the VN agent 204 from the associated access controller 16 to the VN manager 202. If VN agent 204 has replied to the VN manager 202 heartbeat, the state of VN agent 204 will be broadcasted as "ACTIVE". If VN agent 204 fails to respond to a heartbeat, its state will be set to "UNKNOWN". If VN agent 204 closes its connection to the heartbeat during the last period, its state will be updated to "CLOSED". Once the state has been "CLOSED", access controller 16 will terminate its CTP Data Tunneling connection. It should be noted that if an access controller 16 is shutdown or has its associated VN agent 204 disabled (i.e. "CLOSED") then the entry is removed from VN Agent Table (as part of a routine VN manager 202 clean-up operation). However, if the state of VN agent 204 fails to reply (i.e. "UNKNOWN") after a predetermined period of time elapses (i.e. to allow a chance for VN agent 204 to reply), the entry is removed from the VN Agent Table.

An example VN Table element is as follows:

| Sub Field | Size | Description |
|---|---|---|
| IP address | 4 bytes | port that the tunnel is set to |
| Descriptor | | Fully qualified domain name or descriptor for the access controller |
| AC State | | ACTIVE, UNKNOWN, CLOSED |
| Tunnel State | | Connected, disconnected |

The VN MU Session Table maintains the state of mobile units 30 in the network. The Tunnel State is a state that is maintained locally by the VN agent 202 to store the state of the CTP Data Tunnel connection. The VN MU Session Table is used by the control and data planes for the access controller 16 to set up mobile unit 30 connections and to track mobile units 30 as they move from access controller to access controller. The mobile unit table consists of the following fields: MU MAC, MU IP Address, Pairwise Master Key, Home AC (as previously described), and Current AC.

The MU MAC and MU IP Address give the address of the device on the network. The Pairwise master key is used to allow an MU to roam from access controller to access controller without having to go through 802.1x authentication. The Home AC IP Address is the IP address of the access controller 16 where the mobile unit's 30 IP Session resides, this is the IP address of the port supporting CTP data tunneling. The Current AC IP Address is the IP address of CURRENT access controller to which the mobile unit 30 is connected to (i.e. the "active" access controller). The Current AC IP Address value of the Table changes throughout an MU session (also the MU IP address may change). The Current AC IP Address value is updated as the mobile unit 30 moves from one access controller 16 to another in a VN. It should be understood that the CURRENT access controller would be considered to be the FOREIGN access controller (i.e. access controller 16B in FIG. 7) from the HOME access controller's (i.e. access controller 16A) perspective (i.e. when the CURRENT access controller is not the HOME access controller). It is contemplated that the VN MU Session Table will be extended to provide VNS and SSID assignment/membership of a mobile unit 30.

An example VN MU Session Table element is as follows:

Example VN MU Session Table Element

| Sub Field | Size | Description |
|---|---|---|
| MU MAC | 6 bytes | The physical MAC address of the MU |
| MU IP Address | 4 bytes | |
| Pairwise Master Key | 4 bytes | For 802.1x authentication |
| Home AC IP Address | 4 bytes | |
| Current AC IP Address | 4 bytes | |
| Action | 1 byte | ADD/UPDATE 1 WITHDRAW 2 |

Figure 10:
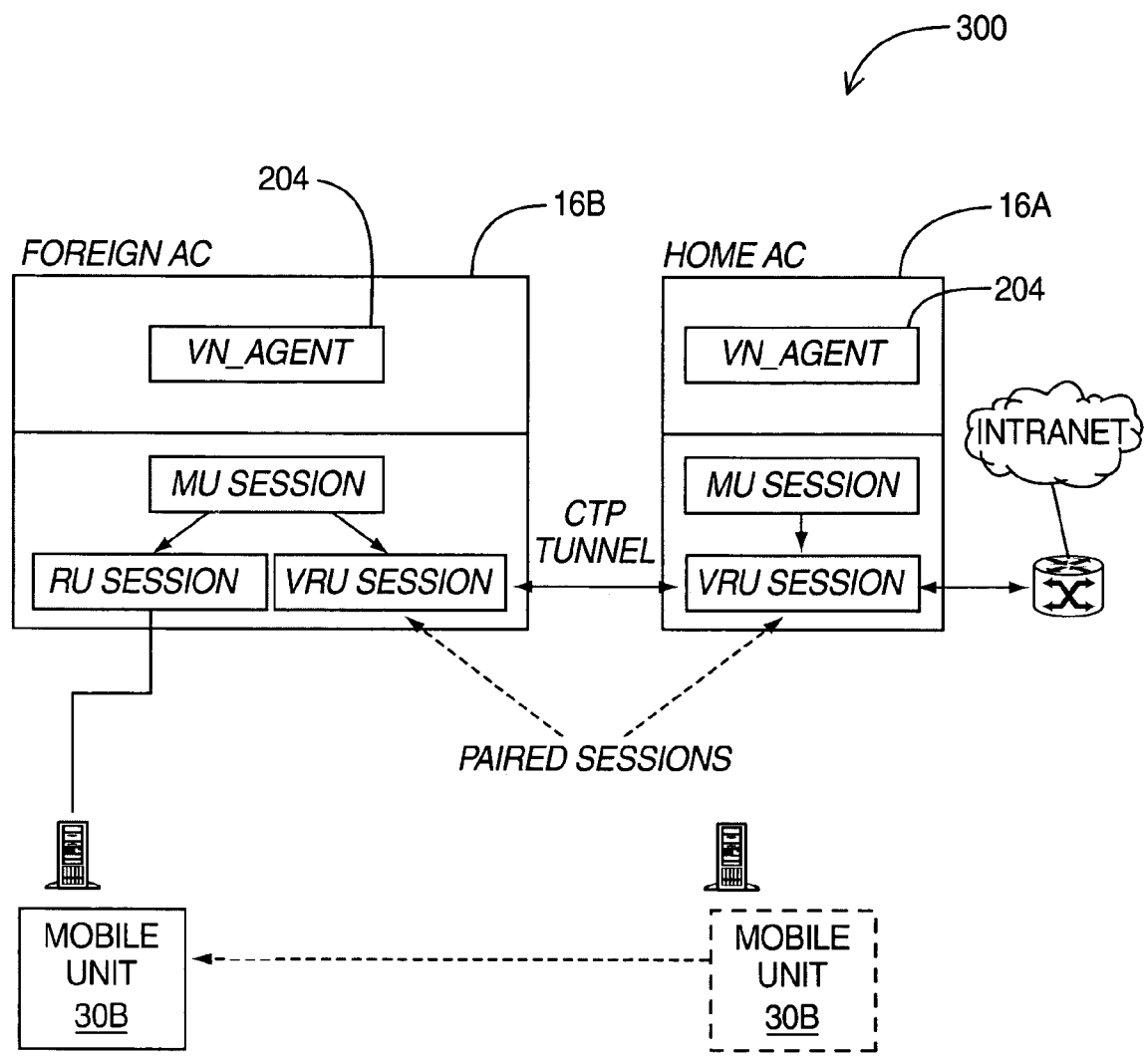
FIG. 10 is a block diagram that illustrates in more detail the registration of a mobile unit session on a FOREIGN access controller host within the AC-AC tunneling architecture of FIG. 7.

Referring now to FIGS. 7 and 10, wireless LAN 10 conducts session management across multiple access controllers 16A and 16B within a single VN by allowing mobile unit 30B to connect to different access controllers 16A and 16B in the VN while preserving the Layer 3 (IP) connection of mobile unit 30B to network 50 without the need for installation of any proprietary client software. Each access controller 16A and 16B within a VN is configured with at least one VN subnet. The configuration includes DHCP, routing, authentication, privacy, and filter profiles, as is normally associated with a normal access controller. When mobile unit 30B establishes a session for the first time, access controller 16A will be configured as a host on an IP subnet. Access controller 16 updates its VN MU Session Table to indicate that it is the HOME access controller 16 for mobile unit 30B.

When mobile unit 30 roams to a radio unit 18D that is associated with another access controller 16B as shown in FIGS. 7 and 10, access controller 16B checks its MU Session Table to determine whether the mobile unit 30 session already exists. If it finds an active session for mobile unit 30, the foreign access controller 16B relays to the HOME access controller (i.e. access controller 16A) the registration characteristics of the associating mobile unit 30. The HOME access controller (i.e. access controller 16A) then determines if the mobility characteristics for mobile unit 30 are correct (e.g. SSID and VNS membership) and informs the new FOREIGN access controller (i.e. access controller 16B) to allow the mobile unit 30 to register. On the FOREIGN access controller (i.e. access controller 16B), the session is known as a "virtual session" which has the virtue of having both physical characteristics in terms of association with a real radio unit 18 on the FOREIGN access controller (i.e. access controller 16B) and a virtual portion to deal with the interaction with the HOME access controller (i.e. access controller 16A) and the CTP data tunnel.

The CTP data tunneling protocol assists in the clean up of mobile unit 30 sessions on foreign access controllers (e.g. like access controller 16B). As part of the CTP protocol, when a mobile unit 30 that was associated with a FOREIGN access controller (e.g. 16B) roams to associate with a different foreign access controller (not shown), the HOME access controller (e.g. 16A) directly informs the original FOREIGN access controller (e.g. 16B) that mobile unit 30 should be removed from its local MU Session Table using the CTP protocol MU disconnect message.

The HOME access controller (i.e. access controller 16A) is responsible for managing the "linger time" of the mobile unit 30 session. The "linger time" is configured as a VNS parameter and represents the time that HOME access controller (i.e. access controller 16A) monitors for traffic from the mobile unit 30 before removing the mobile unit 30 session from the VN MU Session Table. If the mobile unit 30B's CURRENT access controller is not the HOME access controller (e.g. where CURRENT access controller (i.e. access controller 16B) is not the HOME access controller (i.e. access controller 16A)), then HOME access controller (i.e. access controller 16A) informs the CURRENT access controller (i.e. access controller 16B) through. the CTP protocol to remove the session for the mobile unit 30 from the local MU Session Table. Whenever possible, all protocols relating to layer 3 will be handled by the HOME access controller (i.e. access controller 16A). That is, any ARP requests from a roaming mobile unit 30B will be relayed back to the HOME access controller (i.e. access controller 16A). DHCP requests including authentication type messages for 802.1xEAP mobile unit authentication are handled at the HOME access controller (i.e. access controller 16A) (by default).

Reporting on mobile unit 30 sessions is handled at the HOME access controller 16. The HOME access controller maintains all IP session information including the Call Detail Record's and traffic metrics (bytes in/bytes out/packets in/packets out). However, any layer 2 information or real-time information on the location of mobile unit 30 (for example, the radio unit 18 connection and any wireless parameters) are stored -at the current access controller 16B.

FIGS. 7 and 10 illustrate Inter-AC roaming which takes place when a mobile unit 30 roams, from its current radio unit to a radio unit connected to a different access controller 16. When a device (new to the registering or foreign access controller 16) registers, the MU manager queries the local VN agent 204 to determine if a record for this device already exists in the domain. This record will principally indicate the AC_ID of the HOME access controller 16 for the registering device, at which point the MU_Manager can then interface with its RU_Manager in the parameters to obtain the VRU (CTP data tunnel link) to be used to interface with the HOME access controller 16. The FOREIGN access controller 16 (the one with which the device is currently trying to associate) creates an MU session for the device, but proxies the association request to the HOME access controller 16. The purpose of the proxy activity allows the HOME access controller 16 to validate the association request according to its own policy rules. The proxy activity also allows the HOME access controller 16 to be notified that the mobile unit 30 has roamed outside its own radio unit controlled boundary. This is important since access controller 16 can now instruct the original radio unit 18 to delete its current MU session. Also, the HOME access controller 16 will now associate the registering device with the indicated VRU.

It should be understood that although this description explicitly differentiates a physical radio unit from a virtual radio unit (VRU) which represents data tunnel link, in reality a VRU is handled like a physical radio unit 18. As such, to the HOME access controller 16, having the device roam to a VRU requires no different handling than the typical Intra-AC roaming scenario, in that the access controller 16 simply updates the device-to-RU association parameters. The HOME access controller will then provide an MU_ASSOCIATION_RESP Oust as it would for a device associating on a real RU—Remember, in its processing the access controller 16 does not really differentiate the two types of RUs) that will be picked up by the foreign MU_Manager. If the HOME access controller 16 rejected the association then the MU session is terminated on the FOREIGN access controller 16. The corresponding result of the association validation is then proxied back to the physical radio unit 18 device.

Captive Portal Authentication

Figure 11:
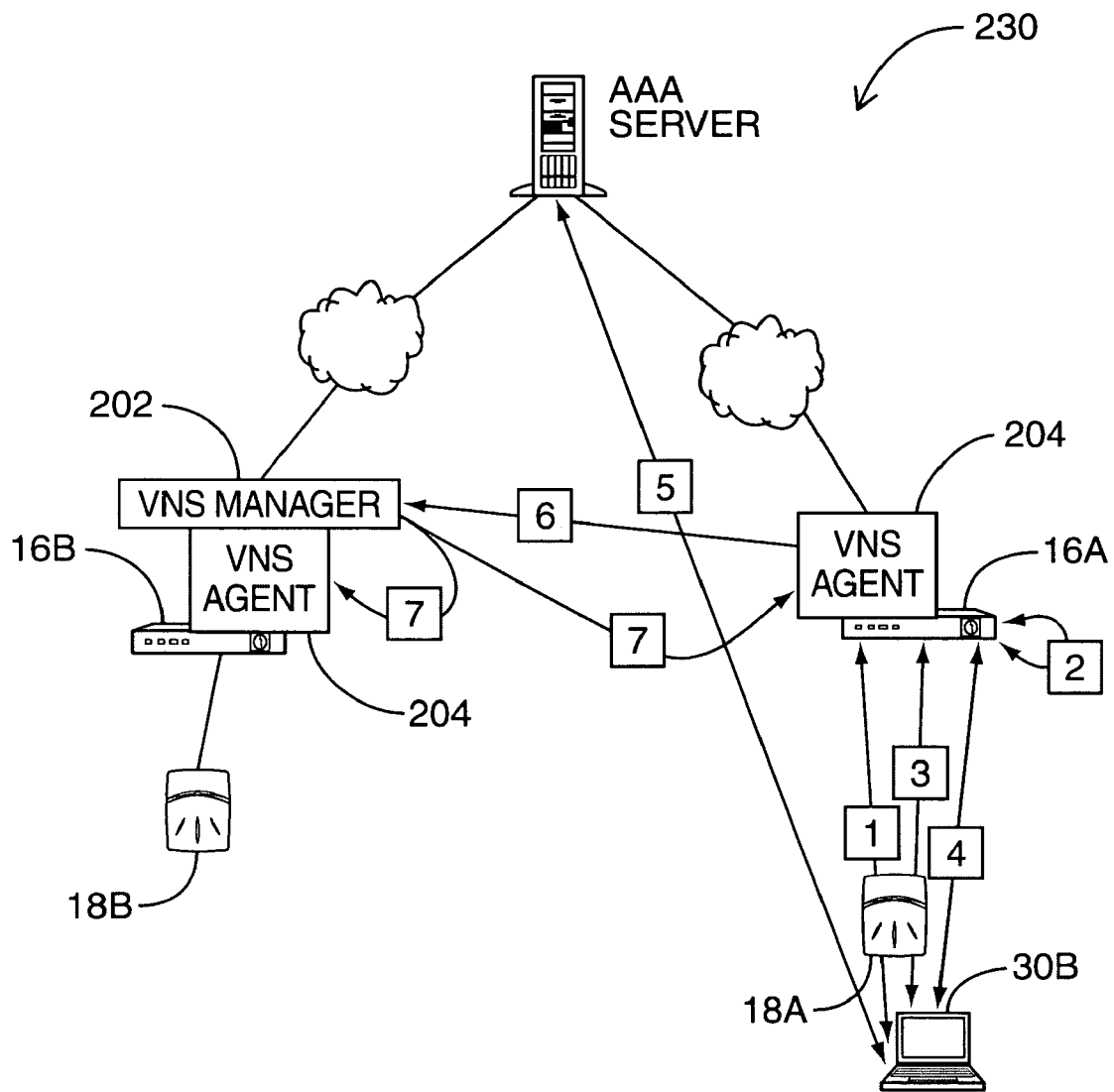
FIG. 11 is a block diagram that illustrates a mobile unit authentication sequence with a Captive Portal.

FIG. 11 illustrates an example network 230 that utilizes a network assignment and authentication process for Captive Portal in accordance with the present invention. The connection process begins with mobile unit 30B associating with radio unit 18A and radio unit 18A forwarding an association message to access controller 16A (at "1"). Access controller 16A checks its MU Session Table (at "2") to find whether mobile unit 30B has roamed from another access controller 16. If a MU session cannot be located, access controller 16A creates a new un-authenticated MU session and stores it MU Session Table. Mobile unit 30B issues a DHCP request to access controller 16A (at "3") and access controller 16A responds with an IP address and other network configuration information.

At this point, the VN MU Session Table is updated (at "4") to reflect the new session for mobile unit 30B that will update the VN manager 202 on the next heartbeat. Mobile unit 30B (at "5" in FIG. 11) has the ability to roam at this point even though the mobile unit 30B session is not authenticated. If a Walled Garden has been set up mobile unit 30B would be allowed access to this. Once mobile unit 30B issues an HTTP request for a website that is outside the Walled Garden, the HOME access controller (i.e. access controller 16A) redirects mobile unit 30B (at "6" in FIG. 11) to a login page. Mobile unit 30B authenticates with access controller 16A at the login page (at "7" FIG. 11), preferably using Captive Portal and RADIUS.

802.1x or WPA Authentication

Figure 12:
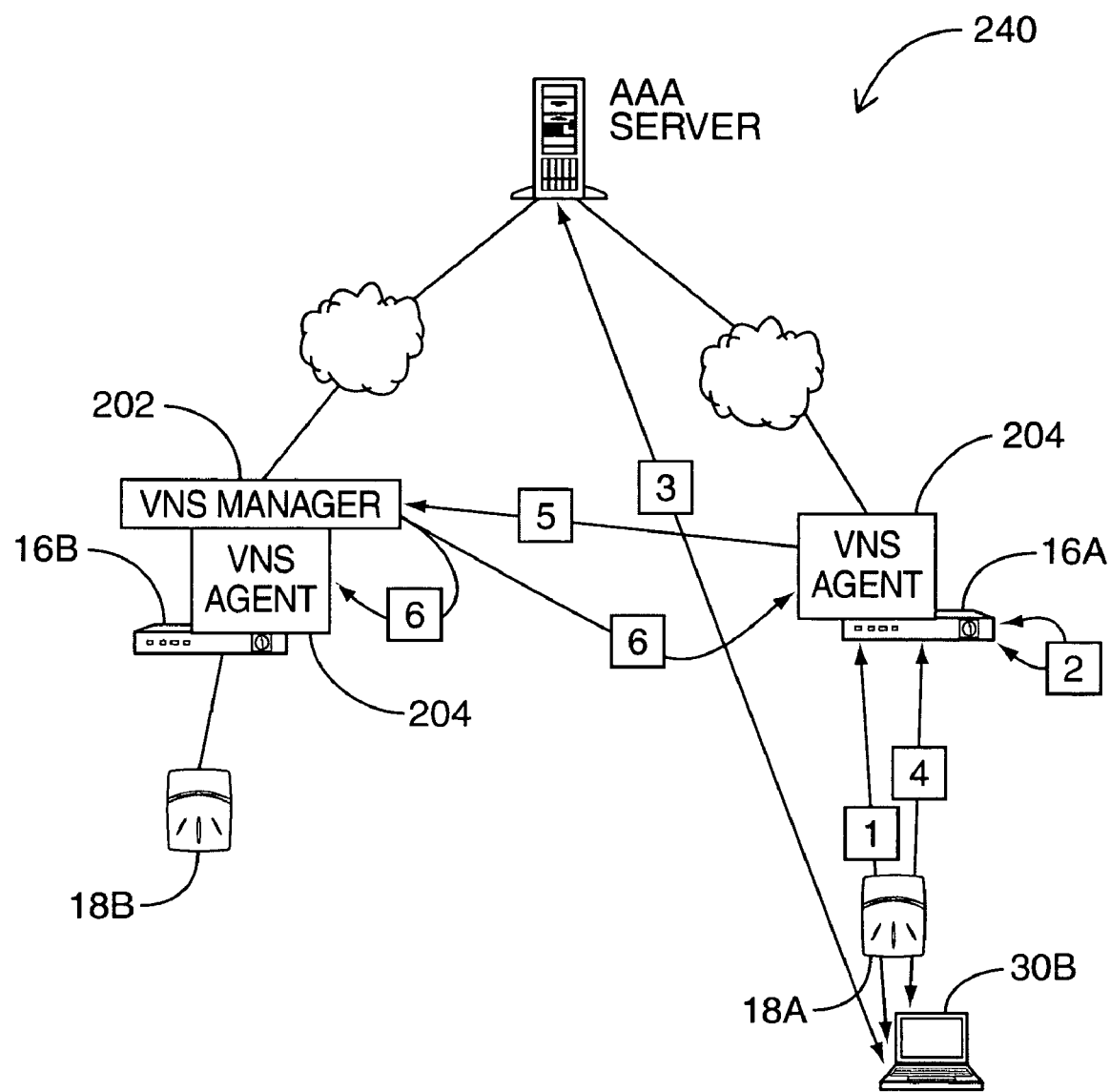
FIG. 12 is a block diagram that illustrates a mobile unit authentication sequence using 802.1x or WPA authentication.

FIG. 12 illustrates an example network 240 that authenticates a mobile unit connection sequence using 802.1x or WPA authentication. In this case, network assignment is conducted after 802.1x authentication. If access controller 16B is configured to use WPA, the VN agent 204 sends the PMK to the VN manager 202 as part of the session update information. The mobile unit connection starts with mobile unit 30A associating with radio unit 18A and radio unit 18A forwarding an association message and authentication type messages (802.1x/EAP) to access controller 16A (at "1" FIG. 11). Access controller 16A checks the local MU Session Table to find whether mobile unit 30B has roamed from another access controller 16 (at "2" FIG. 11).

If access controller 16A cannot find a MU session, it creates a new un-authenticated session. Access controller 16A initiates an EAP sequence and uses RADIUS to authenticate mobile unit 30B (at "3" FIG. 11). If authentication is successful, access controller 16A sends an EAP_Success message and negotiates session keys with mobile unit 30B using the EAPOL four-way handshake (at "4" FIG. 11). The mobile unit 30A then issues a DHCP request and is assigned an IP address. The VN MU Session Table is then updated to reflect the new session for mobile unit 30A (at "5") that will update VN manager 202 on the next heartbeat. Finally, (at "6"), the VN manager 202 updates the new MU session information on the next heartbeat.

Roaming from AC to AC with 802.1x or WPA

Figure 13:
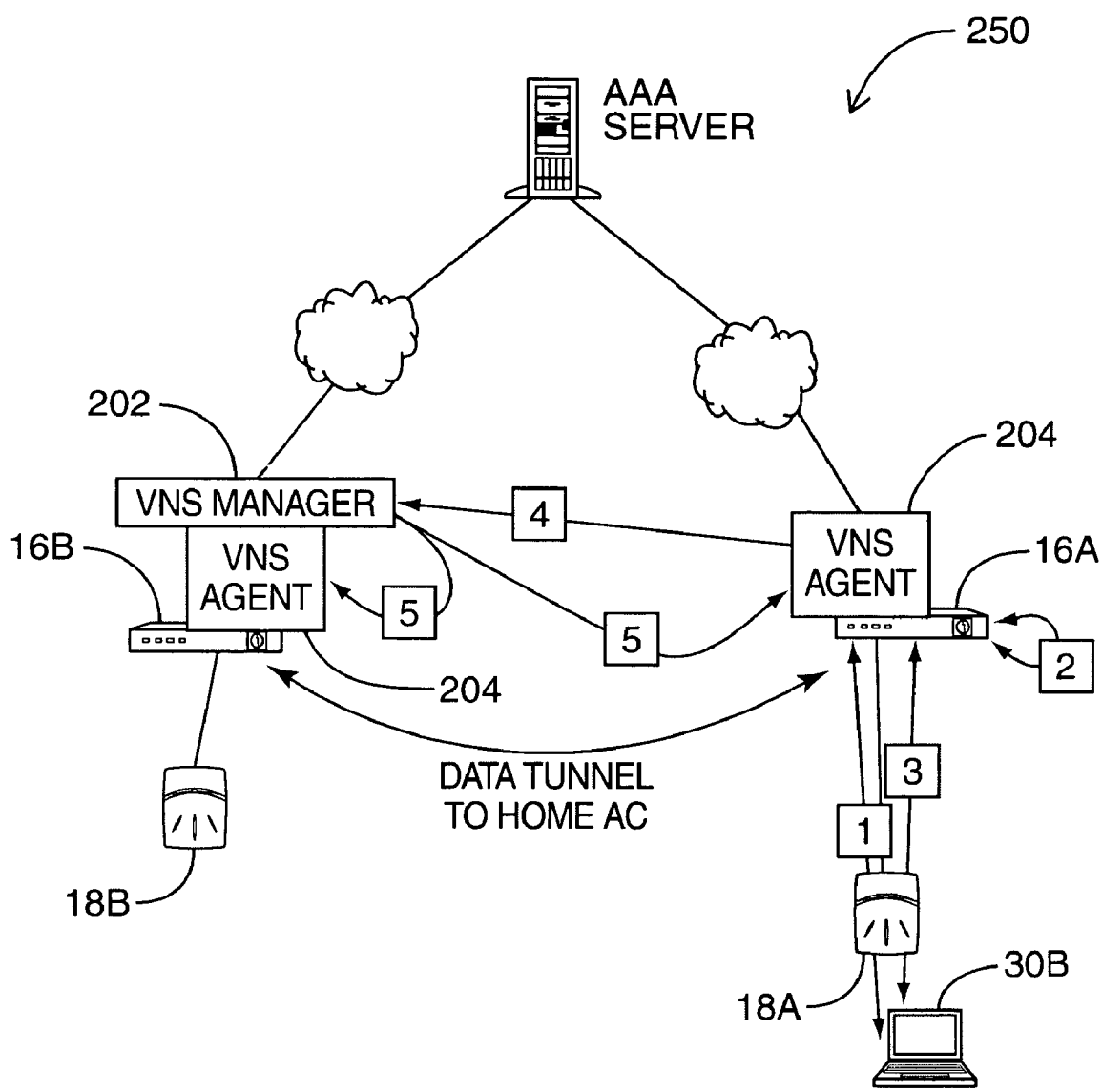
FIG. 13 is a block diagram that illustrates a mobile unit authentication sequence when roaming from AC to AC with 802.1x or WPA.

FIG. 13 illustrates an example network 250 that authenticates a mobile unit 30B connection sequence using 802.1x or WPA when mobile unit 30B roams from access controller 16A to access controller 16B. Access controller 16A uses the MU Session Table to streamline the connection sequence as shown in FIG. 12. When mobile unit 30B connects, access controller 16A checks its MU Session Table to see if mobile unit 30A is listed as having a valid session for the network. If mobile unit 30A does have a valid session, access controller 16A creates an authenticated session and allows mobile unit 30A to communicate on the network. Access controller 16A tunnels all data traffic from mobile unit 30A to HOME access controller (i.e. access controller 16B), for filtering and forwarding.

The connection sequence begins (at "1") with mobile unit 30B associating with radio unit 18A and radio unit 18A forwarding an association message to access controller 16A. Access controller 16A then (at "2") checks its MU Session Table to find whether mobile unit 30B has roamed from another access controller. If a MU session is located, access controller 16A creates a new local authenticated session and forwards the association request on to the HOME access controller (i.e. access controller 16B). In this way, the HOME access controller (i.e. access controller 16B) learns as soon as possible about the fact that an mobile unit 30 has moved to a new access controller 16 so traffic arriving at the HOME access controller (i.e. access controller 16B) can be forwarded to the CURRENT access controller (i.e. access controller 16A). When packets are arriving at the CURRENT access controller before mobile unit 30 is actually through their authentication, the radio unit 18B will drop the data packets since radio unit 18B will not receive a response from mobile unit 30B (since mobile unit 30B has moved).

In the case of 802.1x or WPA (at "3"), the HOME access controller (i.e. access controller 16B) always replies to authentication messages. The CURRENT access controller (i.e. access controller 16A) simply relays all received data (including authentication) back to the HOME access controller (i.e. access controller 16B). The CURRENT access controller (i.e. access controller 16A) initiates the 802.1x authentication sequence and issues an EAP_Success message to : complete the authentication. CURRENT access controller (i.e. access controller 16A) uses the PMK in the MU Session Table and the EAPoL four-way handshake to negotiate session keys and complete the authentication procedure. The VN agent 204 sends a message (at "4") to the VN manager 202 to update the session information. VN manager 202 in turn (at "5") updates the new MU session information on the next heartbeat.

Figure 14:
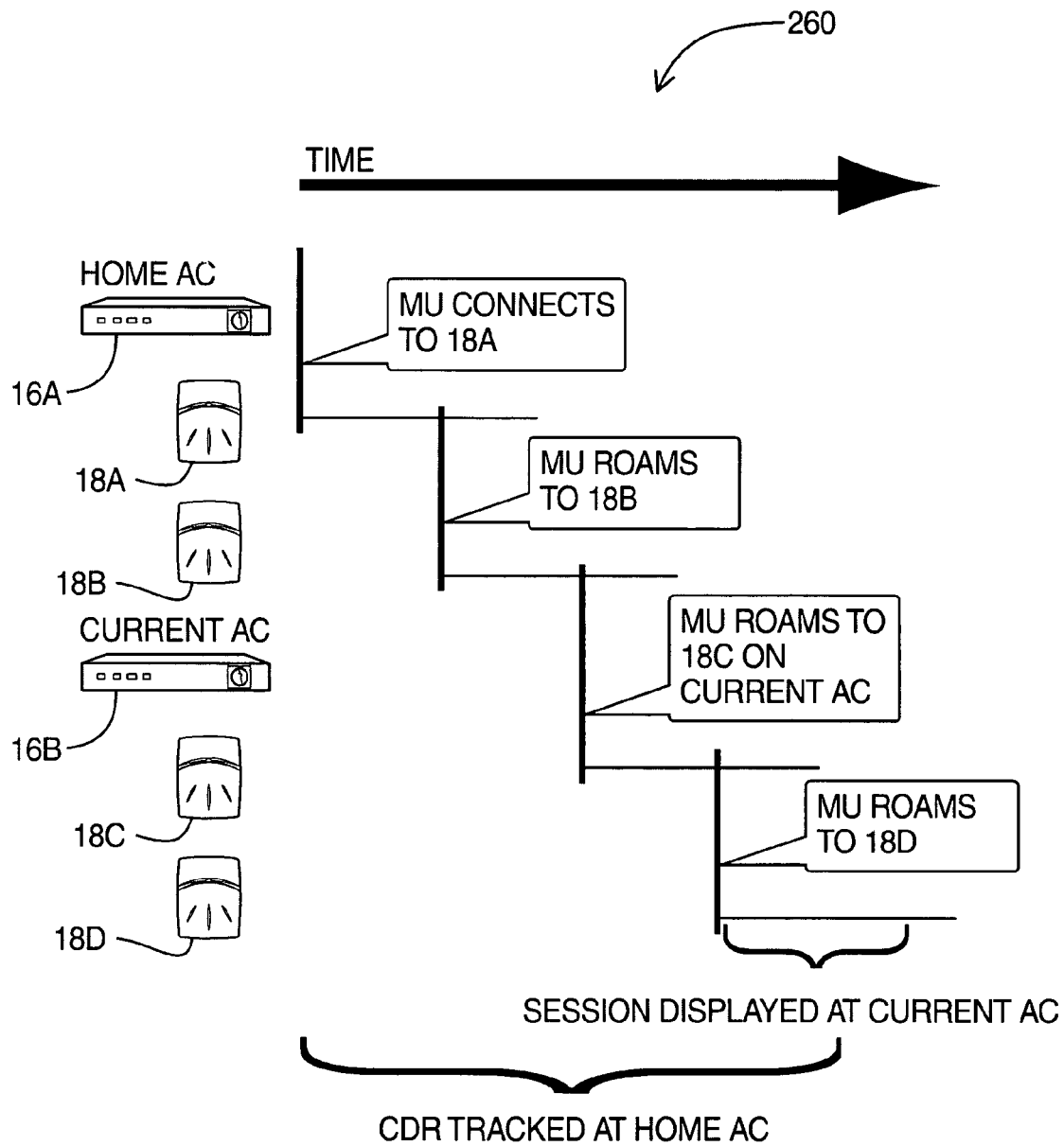
FIG. 14 is a schematic diagram illustrating session tracking across multiple access controllers in the VNS over time.

FIG. 14 illustrates how mobile unit 30 sessions are tracked across multiple access controllers 16 in the VN over time. A mobile unit session can consist of multiple layer 2 (802.11) connections to the access controller/radio unit architecture of wireless LAN 10 even though the access controller 16 maintains the mobile unit's 30 layer 3 (IP) connection to the network. In the case of a single access controller 16, the mobile unit 30 session is maintained at access controller 16 as mobile unit 30 moves from radio unit 18 to radio unit 18. In the multiple access controller 16 architecture, a mobile unit 30 can move from radio unit 18 to radio unit 18 across different access controllers 16 while maintaining a layer 3 connection to the network. The layer 3 connection is always maintained by the HOME access controller as previously discussed.

The HOME ACCESS CONTROLLER (i.e. access controller 16A) maintains the IP session for mobile unit 30 and keeps track of data traffic to/from mobile unit 30B. The CURRENT access controller (i.e. access controller 16B) maintains the 802.11 session for mobile unit 30B while it is connected to one of its radio units 18 on the network. All connected mobile units 30 in the VN can be viewed from any access controller 16 in the VN. The information will describe information on the MU IP address and MAC as well as the HOME access controller (i.e. access controller 16A) and the CURRENT access controller (i.e. access controller 16B). Information on the MU IP session can be obtained at the HOME access controller since the HOME access controller tracks the data transferred between mobile unit 30B and the network.

The HOME access controller also generates the Call Detail Record for mobile unit 30 when its session ends. Information about the current state of the mobile unit connection to the network can be viewed at the CURRENT access controller. The CURRENT access controller (i.e. access controller 16B) tracks which radio unit 18, mobile unit 30 is connected to and information on the wireless connection for radio unit 18. The mobile unit 30 association and disassociations to radio units are stored in the system log on the CURRENT access controller (i.e. access controller 16B). Similarly to as discussed in respect of "linger" time, all mobile unit 30 disassociations will be done at the HOME access controller. If mobile unit's 30 CURRENT access controller (i.e. access controller 16B) is not the HOME access controller, the HOME access controller (i.e. access controller 16A) informs the CURRENT access controller (i.e. access controller 16B) through the CTP protocol to remove the session for mobile unit 30.

Tunneling and CTP

Figure 15:
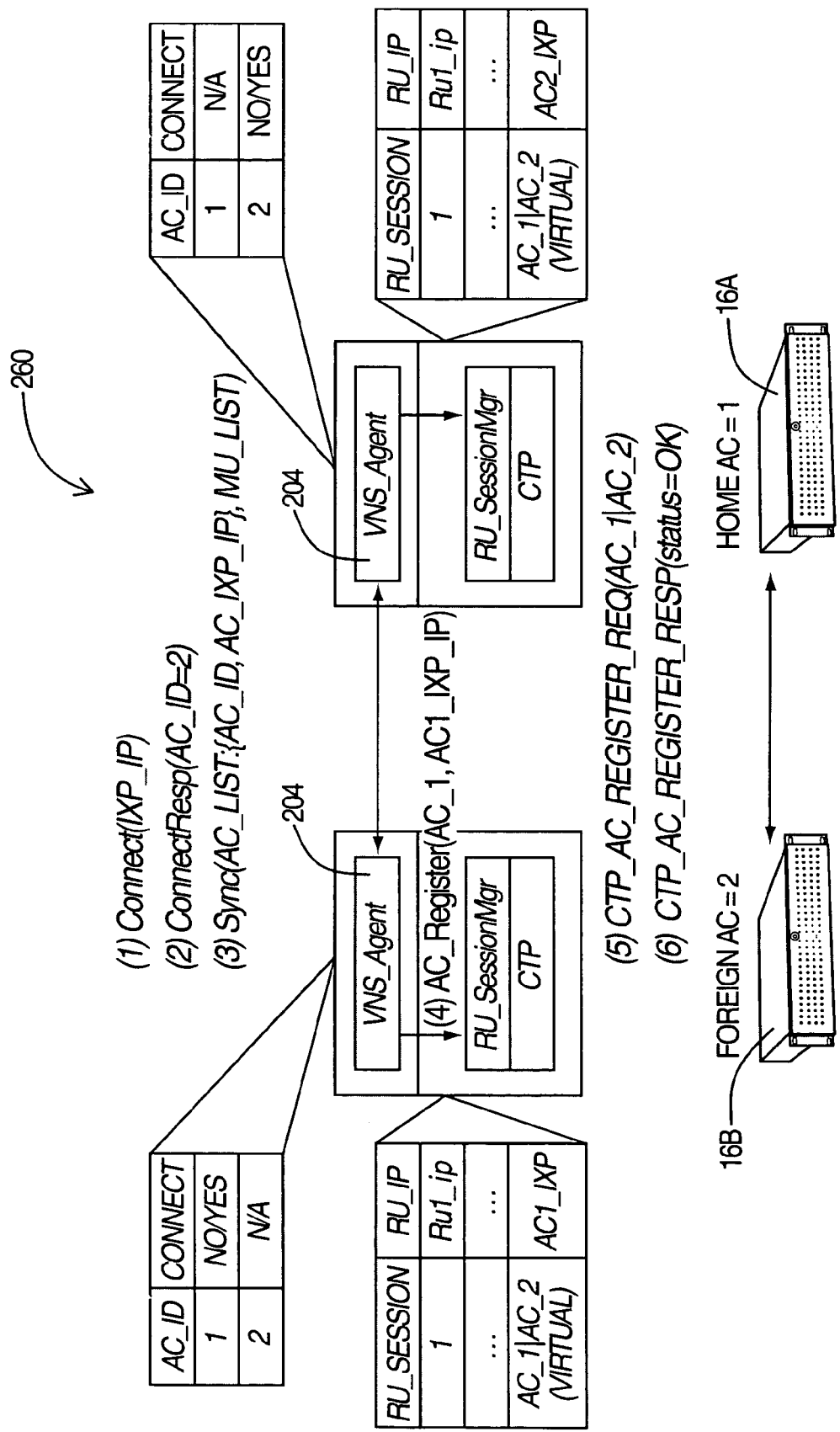
FIG. 15 is a block diagram that illustrates in more detail the registration of a mobile unit session on a FOREIGN access controller host within the AC-AC tunneling architecture of FIG. 7.

FIG. 15 is an example data tunneling configuration 260 between two access controllers 16A and 16B that illustrates the use of the CTP data communication protocol discussed above as the tunneling mechanism for access controller to access controller communications within wireless LAN 10. One result of using CTP for data tunneling is that each access controller 16 can be represented to each other as a radio unit 18. As part of the registration process, the VN agent 204 for the registering access controller 16 will obtain from the VN manager 202 the list of access controllers 16 already registered in the VN domain. The list of access controllers 16 is then passed by the VN agent 204 to the RU Session Manager as shown in FIG. 14 that then takes upon the task of establishing CTP tunneling sessions with each of the identified access controllers 16. Even though the tunneling protocol is based on CTP, the registration process for Inter-AC CTP tunnels uses a specialized set of messages that provide a specialized registration process. This guarantees that each of the systems recognizes that the established tunnel is in fact an access controller tunnel. This message set is designed so as to allow each participating access controller 16 to have a mechanism for negotiating the RU session ID by which the tunnel will be known. This is slightly different from the typical RU registration, as in the usual case, the RU Session ID is assigned by the access controller 16. In the case where the tunnel is being established between two access controllers 16, then both access controllers would attempt to uniquely identify the tunnel.

The tunneling model is the second tier of a two-tiered architecture for supporting mobile unit sessions across multiple access controllers 16. The tunneling model is based on the principle that a connected mobile unit IP session and policy is hosted at one access controller 16, namely the HOME access controller, while the mobile unit's 30 layer 2 wireless connection is free to roam across groups of access controllers that are part of a particular VN. The tunneling architecture for multiple access controllers 16 uses the same nodal access controller hardware and additional software to provide roaming and availability. The use of CTP as a data tunnel solution between access controllers 16 allows an access controller 16 to appear to another access controller 16 as simply a radio unit 18 (i.e. can contain many sessions and does not require configuration changes).

One of the key requirements for the CTP tunneling implementation is the provision for uniquely identifying each of the systems within a mobility domain. To provide such functionality, each system is assigned a unique ID, namely AC_ID. The unique ID, AC_ID is negotiated during a VN Manager/Agent registration phase. VN Manager 202 assigns a registering VN agent 204 the unique AC_ID that it will have in the VN 202. The VN Agent 204 then provides the data plane with indication of the registered AC_ID following VN registration. Following this, all events exchanged from the control plane to the management plane will carry the originator's AC_ID.

Domain membership list (or the AC_ID list) is fundamental to the operation of the system and provides the essence of Inter-AC communications. The domain membership list is created dynamically as access controllers 16 register themselves with the VN manager 202. As each successive access controller 16 registers, the list grows. Modifications to the list are then propagated to all registered access controllers 16 who then participate in the establishment of tunnels to access controllers 16 to which they are not currently connected. As each access controller 16 receives the periodic advertisement containing the state of access controller 16 registrations, it compares the propagated list, with it's own current state. The VN agent 204 maintains a connection list. For each entry in the propagated list that the receiving access controller 16 is not currently connected to, VN agent 204 will attempt establish a connection as long as its own AC-ID is greater than the AC_ID of the entry.

In order to establish tunnels to the remote access controllers 16 VN agent 204 explicitly-sends a request to the RU Session Manager that a connection be established to the specified access controller 16, by indicating the pair of AC_ID and corresponding data plane IP address for the port to which the tunnel should be established. The connection process is initiated via a AC_Connect_Req message. The RU Session Manager then establishes a CTP tunnel connection with the indicated parameters.

The Inter-AC tunneling establishment is facilitated though the extension of CTP functionality within AC-AC configuration 260 as shown. This approach consists of introducing into CTP the capability of representing each AC-link as a radio unit 18 to requesting system. With this approach, the existing functionality of associating mobile unit sessions to radio units remains intact. This provides a simplified processing model for system operations, and in particular, for the data processing components. Accordingly, the current infrastructure of wireless LAN 10 discussed above, can be leveraged with minimum modifications to accommodate CIP data tunneling.

Of particular interest to the establishment of the data tunnel is the fact that each radio unit 18 session within a VN is uniquely identifiable via its radio unit Session ID. Each access controller 16 assigns to its registering radio units 18 its own unique Session ID according to the state of its current session tables. In order to properly administer cross-linked sessions, it is important that Session IDs match for the cross-linked sessions. That is, when access controller 16 writes to the tunnel it should use the session ID that the corresponding peer has also assigned to the same tunnel. Now, since each access controller 16 is responsible for assigning their own session IDs, it is necessary to provide a mechanism whereby a common ID can be assigned. One mechanism is to establish a reservation based negotiations algorithm under which each access controller 16 attempts to suggest different IDs that it has available until both access controllers 16 agree on a common one.

Figure 16:
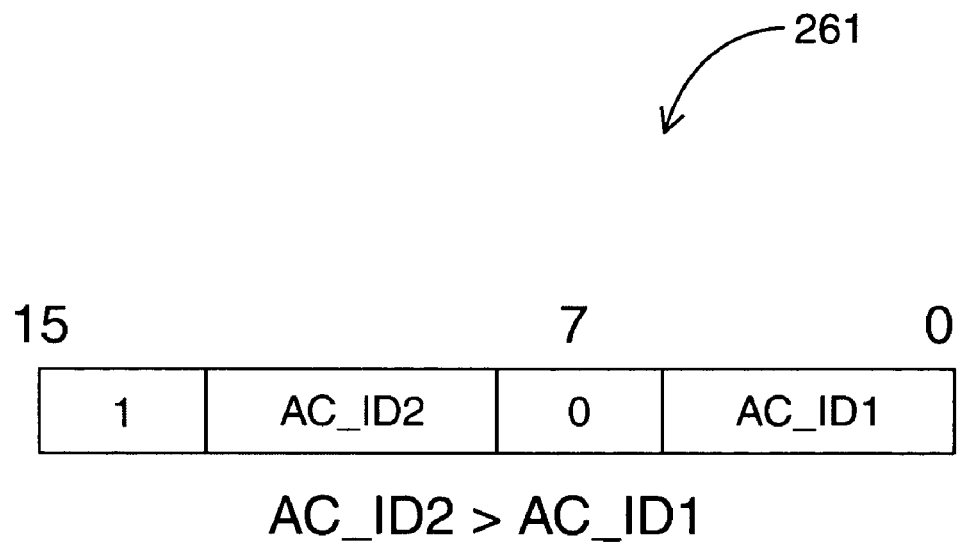
FIG. 16 is a schematic diagram of a unique AC-AC identifier utilized in the AC-AC tunneling architecture of FIG. 7.

FIG. 16 illustrates a more efficient method of obtaining a common ID that guarantees uniqueness of the common ID. Uniqueness is guaranteed by taking advantage of the Session ID assignment profile for current RU Session Manager. Currently, Session IDs are defined as 16 bit numbers, assigned sequentially by the RU Session Manager. As such, the uniqueness algorithm for Virtual RU (which is in essence how the AC-AC link is known to the system) is implemented as follows. The established Session ID is composed based on the IDs of the two systems establishing a connection (7 bits—which limiting the maximum number of domain access controllers 16 to 127), with the largest AC_ID occupying the lower 7 bits of the upper byte and the lowest AC_ID occupying the last 7 bits of the lower byte. The most significant bit is enabled in virtual radio units 18 so as to provide an easier and straight forward method of differentiating virtual radio units 18 from real radio units 18 when necessary. This approach is illustrated by the bit configuration 261 of FIG. 16. Virtual RU links (i.e. the CTP data tunnel link) are not associated with a specific SSID. If necessary to convey SSID information in the data exchanges the SSID field for the CTP message is filled in corresponding to the device's current physical RU association. With this method, each access controller 16 is able to identify any other domain access controllers 16 and to establish an unique ID. Additionally, it is actually important that the Session ID is programmatically determined as it allows access controller 16 components to deterministically identify the correct link—i.e. the virtual radio unit (VRU) that should be used for any required communications.

Since the VRU session ID is predetermined, the link establishment procedure requires simply a small extension of the current CTP message set to support AC_REGISTER_REQ and AC_REGISTER_RESP functionality. With these messages, the connecting access controllers 16 are able to pre-construct a session ID for an access controller 16 to which they are not yet connected and request that a VRU session be established between the two interested parties. Both parties end-up with a VRU session with same identifier. Following session establishment, the created radio unit 18 session is then available by both the data and control plane components so that data can flow across the tunnel for delivery to a registered mobile unit 30. The process of session establishment and registration varies slightly depending on whether the device is already known in the domain and if so, session registration is established by tight cooperation between the access controller's VN agent 204 and the MU_Session_Manager.

When a mobile unit 30 associates with a radio unit 18, the access controller 16 is notified via a CTP_MU_AUTHENTICATE_REQ. The CTP MU registration message is also extended to provide the textual representation of the SSID associated with a mobile unit 30 at a FOREIGN access controller 16. This message is delivered to the MU_SESSION_MANAGER, which first attempts to determine whether it already knows about the session. For the case of a new device, this lookup would fail, at which point the MU_SESSION_MANAGER will attempt to query local VN agent 204 to determine if the device is known to the domain. At this point, the VN agent 204 consults it's copy of the domain MU registration tables, and upon failing to locate a session for the registering device, will then respond to the MU_SESSION_MANAGER, indicating that no session was located. At this point the MU_SESSION_MANAGER creates a brand new session that it associates with the radio unit 18 and the corresponding VN. The registration notification is then provided to the VN agent 204 that propagates the relevant registration information to the VN manager 202 so that other access controllers 16 can now learn that the device exists in the domain. The VN agent 204 propagates the change of state (registration, de-registration) of sessions for which it is the HOME access controller. It is contemplated that VN agent 204 will also propagate SSID and VNS membership information.

Mobile unit 30 roaming falls into two specific categories, namely Intra-AC Roaming where the mobile unit 30 roams within the same SSID to an RU that is connected to the same HOME access controller for the session and Inter-AC Roaming, where the mobile unit 30 roams within the same SSID to an RU that is connected to a different access controller 16 than the HOME access controller for the session. The first category, namely, intra-AC roaming is already handled by the modal functionality of access controller 16 and is responsible for tracking the mobile unit 30 session as it roams from one radio unit 18 to another.

Figure 17B:
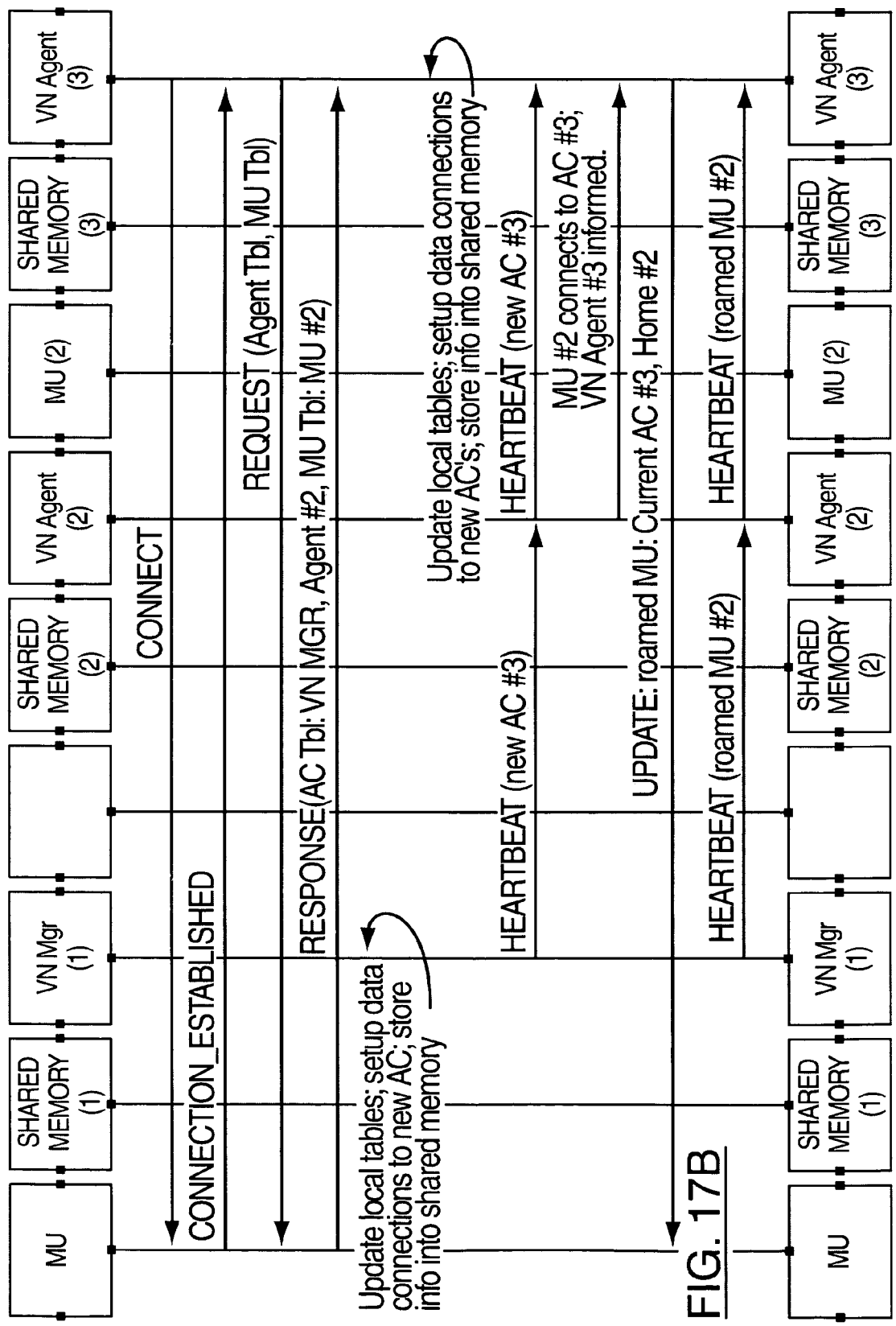

FIGS. 17A and 17B are communication sequence diagrams that illustrate the process flow for VN manager 202 and VN agent 204 within an example wireless network having three access controllers 16: AC#1, AC#2, AC#3 (where AC#2 is the HOME access controller) and two mobile units 30: MU#1 and MU#2.

Referring back to FIGS. 7 and 10, example network 190 illustrates how the system operates in various situations (i.e. where devices are removed or added to the network). As shown, example network 190 consists of three access controllers. Specifically, a VN Manager AC (an access controller 16C in the VN that is responsible for VN manager functions), a HOME access controller (an access controller 16A that mobile unit 30A first connected to), and FOREIGN access-controller (an access controller 16B that mobile unit 30 is currently connected to if it is not the HOME access controller). Also, HOME VN agent 204 is the VN agent that resides on mobile unit's 30 HOME access controller (i.e. access controller 16A). HOME mobile unit 30 is the mobile unit 30A for whom it's HOME access controller is the same as it's FORIGN access controller. FORIGN VN agent 204 is the VN agent that resides on the Foreign AC 16B; FOREIGN mobile unit is the mobile unit 30 on access controller 16B in which the HOME access controller is not the same access controller 16. The VN control protocol is the TCP/IP protocol between the VN manager 202 and VN agents 204. The CTP Data tunneling is the UDP protocol between each access controller 16A and 16B in the VN.

CTP Data Tunnel Failure

When a CTP data tunnel fails between two access controllers 16 there is no path to support the tunneling of user data between the two access controllers 16. Each of the network devices behaves as follows when this occurs. First, each access controller 16 will recognize that the CTP link is unavailable when it does not receive a response from another access controller 16 (through CTP keepalive message). At this point access controller 16 will update its MU Session Table by removing all Foreign mobile units 30 that have their HOME access controller set to the FOREIGN access controller and removing all Home mobile units 30 that are currently connected to the FOREIGN access controller. In doing so access controller 16 must also close all accounting records for HOME mobile units that have been removed. Additionally the HOME access controller updates the VN MU Session Table by removing all HOME mobile units 30 that are currently connected to the FOREIGN access controller.

While the FOREIGN access controller status is still "ACTIVE" in the VN Agent Table, the HOME access controller 16 will continue to try and connect a CTP Data Tunnel to the FOREIGN access controller 16. However, mobile units 30 that attempt a connection and have their HOME access controller set to the FOREIGN access controller representing the failed CTP tunnel will be refused a connection. In the case of a CTP data tunnel failure, both the HOME access controller and FOREIGN access controller remove delete and disconnect any MU sessions that were in some way associated with the failing CTP data tunnel. At the FOREIGN access controller the mobile unit 30 will now attempt to re-register and since the registration cannot be completed across the tunnel, the MU session is made local and this access controller 16 now becomes the HOME access controller. If a conflict is then detected in which more than one VN Agent claims to be the Home session for a particular mobile unit 30, the VN Manager's conflict resolution will be invoked. In such a case, the VN manager 202 will instructs both access controllers 16 to delete/disconnect the affected session. This will remove mobile unit 30 from the system and force mobile unit 30 to re-associate with the correct system. Wherever the mobile unit 30 is actually connected will then become the HOME access controller.

VN Control Protocol Failure

When a VN Control Protocol fails between a VN manager 202 and a VN agent 204 there is no longer a mechanism to distribute VN agent and MU Session information. Each of the network devices behaves as follows when this occurs. VN manager 202 will recognize a failure of the VN control protocol between itself and an access controller 16 through the termination of the TCP/IP connection or no response after a heartbeat. VN manager 202 will wait a configurable amount of time for the re-establishment of that connection from the VN Agent on access controller. If the time expires the VN manager 202 will update its VN Agent Table and place the access controller 16 in an "UNKNOWN" state and distribute the VN Agent Table at the next heartbeat.

Access controller 16 will recognize a failure of the VN Control Protocol between itself and another access controller 16 through the termination of the TCP/IP Connection or if it does not receive a heartbeat within the specified heartbeat timer. The access controller 16 will attempt to reconnect to the VN manager 202 a configurable number of times. VN agent 204 also instructs the data plane to terminate any (if still established) CTP data tunnels. Also, the VN manager 202 will instruct the data plane to terminate the (if still established) CTP data tunnel to the VN agent 204 that is not in communication. The termination of the CTP data tunnel will force the disconnection of any sessions associated with the CTP data tunnel at both the HOME and FOREIGN access controllers as discussed previously. If all these attempts fail, access controller 16 needs to change its mode of operation to represent the fact that it's VN agent 204 and VN MU Session Table are no longer valid. All sessions associated with the failing endpoint (HOME or FOREIGN) will be deleted by virtue of the termination of the CTP data tunnel.

Any new sessions at the access controller 16 will be assigned to the access controller 16 as HOME mobile units. At some configurable interval access controller 16 will perform a Directory Agent lookup for a VN manager. 202 and attempt another connection. Access controllers 16 that still have a connection to the VN manager will continue to operate as normal. In the case where an access controller 16 completely disappears, the MU Sessions associated with the disappeared access controller (i.e. those mobile units having their HOME access controller set to be the disappeared access controller) must be removed from the VN MU Session Table by VN manager 202. The result would be that any mobile units 30 that try to roam will appear as new sessions on the access controllers 16 that are still active in the VN.

The sessions are cleaned since the CTP data tunnel is forced to close. If after re-establishment, more than one access controller 16 believes that they are HOME access controller to the same mobile unit 30, then the conflict resolution mechanism described above would ensure that the proper HOME access controller is identified. Accordingly, it is contemplated, that each access controller would send up the status of its CTP Tunnel connection to allow the VN manager 202 to determine this event and then whether the removal of MU sessions from the VN MU Session Table is appropriate in the circumstances.

In summary, wireless LAN 10 provides a two tier architecture that allows a customer to address capacity and geographic scaling depending on the network topology. The AC-AC architecture of wireless LAN 10 can scale in a geographically dispersed topology and in a concentrated network topology. Geographically dispersed nodes (i.e. access controllers 16) tunnel traffic when wireless mobile units 30 roam between radio units connected to different access controllers. They tunnel traffic to preserve the IP configuration of the wireless client on the network. Different access controllers 16 communicate to exchange session information and each access controller 16 has its own management interface. A VN manager 202 and VN agents 204 allow access controllers 16 to exchange session information.

It is contemplated that new hardware will be used as the base for a stackable solution. Stacked access controllers 16 will be treated as an access controller group providing a scalable solution to address capacity. Access controllers 16 are linked using a switching fabric and act a single management entity. VN networks are configured across the group as if it was a single access controller 16 through the master access controller. The group will be configured through a single user interface and hardware resources will be shared across the group. Hardware and software resources for the group can be configured to maintain service in the case where one of the AC's in the group goes down. The master access controller 16 communicates with other access controller nodes to provide VN coverage in geographically dispersed network.

Also, it is contemplated that along with the access controller configuration information, VNS information would also be distributed to provide another layer of functionality. Virtual Network Services (VNS) is a network service that allows for the association of mobile units 30 with a VNS in order to control the sessions of these mobile units 30. Specific policies can be applied to that group such as the applicable security mechanism, what grade of service (silver, gold, platinum) or what back-end network their traffic should be associated with. VNS can also be used to define multiple security models on a single platform and can provide mobile units 30 with connections that are secured and provisioned with Quality of Service (QoS). Accordingly, when a mobile unit 30 connects to wireless LAN 10, VNS factors would be used to assign mobile unit 30 to a Home access controller 16 that could be different then the first access controller 16 that they connected to. For example, if a specific VNS was defined to have an egress interface that existed on access controller 16B (FIG. 7) any mobile units 30 that connected to access controller 16A but were determined to belong to this VNS would have their home access controller set to be access controller 16B.

Finally, it is contemplated that the functionality of wireless LAN 10 discussed above could be further extended to support access controller redundancy. That is, in that if an access controller 16 fails, the radio units 18 associated with the failed access controller 16 would connect to a remaining (operational) access controller 16. In order to support such a redundancy function, it would be necessary to also maintain and distribute radio unit configuration information in addition to access controller and mobile unit session information.

As will be apparent to those skilled in the art, various modifications and adaptations of the structure described above are possible without departing from the present invention, the scope of which is defined in the appended claims.

The invention claimed is:

1. A wireless network for providing continuous communication service to mobile units within a virtual network without the need to install software on the mobile units, said virtual network comprising:

at least two access controllers;

at least one radio unit having control and data path linkage to and communicating with each of said at least two access controllers, wherein packet based communications between radio units and each respective linked access controller have two separate layers, mobile units initially connecting to the virtual network connecting to an access controller through one of the radio units and associating with the connected access controller as a home access controller, and while each mobile unit is connected to the virtual network, other access controllers are foreign access controllers for said each mobile unit;

a virtual network manager (VN manager) in one of said at least two access controllers configured to maintain a virtual network configuration record including all active access controllers within the virtual network including home and foreign access controllers and to disseminate said virtual network configuration record to all active access controllers;

said all access controllers being configured to:
(i) establish a tunneling data communication connection between each said home access controller and foreign access controllers based on the current record maintained by said VN manager, and
(ii) utilize the tunneling data communication connection between each said foreign access controller and said each home access controller; and said tunneling data communication connection to provide continuous data communication for mobile units at radio units at foreign access controllers without the need to install software on the mobile units, the tunneled data being encapsulated in a second of said two separate layers;
wherein said two separate layers include a radio unit layer and a mobile unit layer and said tunneled data is a payload in said mobile unit layer.

2. The wireless network of claim 1, wherein each of said home and foreign access controllers are associated with home and foreign virtual network agents (VN agents), respectively, said home and foreign VN agents being configured to update said virtual network configuration record through communication with VN manager.

3. The wireless network of claim 2, wherein said home and foreign VN agents are configured to communicate with the VN manager to obtain a list of active access controllers in the virtual network and to maintain a list of mobile unit sessions in the virtual network.

4. The wireless network of claim 2, wherein VN manager disseminates said VN configuration record to said home and foreign VN agents using heartbeat notification.

5. The wireless network of claim 1, wherein said access controllers are configured to confirm whether each connecting mobile unit is already connected to the virtual network, before performing authentication on the connecting mobile unit and conducting steps (i) and (ii).

6. The wireless network of claim 1, wherein the maintenance of continuous communication service includes the preservation of the IP configuration of mobile units on the virtual network.

7. The wireless network of claim 1, wherein said virtual network is associated with virtual network services, and wherein said access controllers are configured to manage the mobile unit communication sessions in accordance with said virtual network services.

8. The wireless network of claim 7, wherein said access controllers are configured with at least one VNS subnet having VNS properties selected from the group consisting of: DHCP, routing, authentication, privacy, and filter profiles; and wherein said radio units ignore packet communications layers above said two separate layers.

9. The wireless network of claim 1, wherein said packet based communications are Internet Protocol (IP) packets, the radio unit layer having a radio unit header and the mobile unit layer having a mobile unit header, said payload being the mobile unit header payload.

10. A method for providing continuous communication service for mobile units roaming within a virtual network without the need to install software on the mobile units, said method comprising the steps of:
(a) connecting a mobile unit to the virtual network, the virtual network including a plurality of radio units and a plurality of access controllers, one of said access controllers including a virtual network manager (VN manager), each of said plurality of access controllers having control and data path linkage to and communicating with at least one radio unit, wherein packet based communications between said plurality of radio units and linked access controllers have two separate layers, initially connecting said mobile unit to a radio unit associating said mobile unit with a respective access controller as a home access controller while said mobile unit is connected, others of said plurality of access controllers being foreign access controllers to said mobile unit while said mobile unit is connected;
(b) using the VN manager to maintain a virtual network configuration record including all active access controllers within virtual network including home and foreign access controllers and to disseminate said virtual network configuration record to said all active access controllers;
(c) establishing a tunneling data communication connection between all active access controllers including between said foreign access controller and said home access controller;
(d) determining whether the mobile unit has roamed from the home access controller to the foreign access controller;
(e) if step (d) is true, then:
(i) transmitting communication data between the mobile unit and said foreign access controller;
(ii) decapsulating data from a second layer of said two separate layers; and
(iii) utilizing decapsulated data from step (ii) and tunneling data communication connection between said foreign access controller and said home access controller to provide continuous data communication for the mobile unit without the need to install software on the mobile units;
wherein said two separate layers include a radio unit layer and a mobile unit layer and said tunneled data is a payload in said mobile unit layer.

11. The method of claim 10, wherein each of said access controllers are associated with respective virtual network agents (VN agents) for updating said virtual network configuration record through communication with VN manager.

12. The method of claim 11, further comprising the step of first and second VN agents communicating with the VN manager to obtain a list of active access controllers in the virtual network and to maintain the list of mobile unit sessions in the virtual network.

13. The method of claim 11, further comprising the step of disseminating said VN configuration record from said VN manager to said VN agents using heartbeat notification.

14. The method of claim 10, further comprising the step of said foreign access controller confirming that the mobile unit is already connected to the virtual network, and performing authentication on the mobile unit, before performing step (e).

15. The method of claim 10, wherein said radio units encapsulate communication data from mobile units for transmission to respective access controllers.

16. The method of claim 10, wherein said packet based communications are Internet Protocol (IP) packets, the radio unit layer having a radio unit header and the mobile unit layer having a mobile unit header, said payload being the mobile unit header payload and the maintenance of continuous communication service includes the preservation of the IP configuration of mobile unit on the virtual network.

17. The method of claim 10, wherein the virtual network is associated with virtual networking services, and wherein said home and foreign access controllers manage the mobile unit communication session in accordance with said virtual networking services.

18. The method of claim 17, wherein said access controllers are configured with at least one VNS subnet having VNS properties selected from the group consisting of: DHCP, routing, authentication, privacy, and filter profiles; and wherein said radio units ignore packet communications layers above said two separate layers.

\* \* \* \* \*